United States Patent
Petrushin

(10) Patent No.: US 7,627,475 B2
(45) Date of Patent: Dec. 1, 2009

(54) DETECTING EMOTIONS USING VOICE SIGNAL ANALYSIS

(75) Inventor: Valery A. Petrushin, Buffalo Grove, IL (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 11/716,240

(22) Filed: Mar. 8, 2007

(65) Prior Publication Data

US 2007/0162283 A1     Jul. 12, 2007

Related U.S. Application Data

(63) Continuation of application No. 10/194,908, filed on Jul. 12, 2002, now Pat. No. 7,222,075, which is a continuation-in-part of application No. 09/833,301, filed on Apr. 10, 2001, which is a continuation of application No. 09/388,909, filed on Aug. 31, 1999, now Pat. No. 6,275,806.

(51) Int. Cl.
*G10L 21/00* (2006.01)
*G10L 15/00* (2006.01)

(52) U.S. Cl. .................. 704/270; 704/231; 704/274

(58) Field of Classification Search .................. None
See application file for complete search history.

(56) References Cited

U.S. PATENT DOCUMENTS

| | | | |
|---|---|---|---|
| 3,691,652 A | 9/1972 | Clynes | 35/22 R |
| 3,855,416 A | 12/1974 | Fuller | 179/1 SA |
| 3,971,034 A | 7/1976 | Bell, Jr. et al. | 346/1 |
| 4,093,821 A | 6/1978 | Williamson | 179/1 MN |
| 4,142,067 A | 2/1979 | Williamson | 179/1 SC |
| 4,216,594 A | 8/1980 | Farley et al. | 35/22 R |
| 4,472,833 A | 9/1984 | Turrell et al. | 381/56 |
| 4,490,840 A | 12/1984 | Jones | 381/48 |

(Continued)

FOREIGN PATENT DOCUMENTS

EP     1 222 656 B1     6/2005

(Continued)

OTHER PUBLICATIONS

Savitch, Walter. "Problem Solving with C++: The Object of Programming" Addison Wesley Longman, Inc. pp. 2-7, 1999.*

(Continued)

*Primary Examiner*—Matthew J Sked
(74) *Attorney, Agent, or Firm*—Brinks Hofer Gilson & Lione

(57) ABSTRACT

A system and method are provided for detecting emotional states using statistics. First, a speech signal is received. At least one acoustic parameter is extracted from the speech signal. Then statistics or features from samples of the voice are calculated from extracted speech parameters. The features serve as inputs to a classifier, which can be a computer program, a device or both. The classifier assigns at least one emotional state from a finite number of possible emotional states to the speech signal. The classifier also estimates the confidence of its decision. Features that are calculated may include a maximum value of a fundamental frequency, a standard deviation of the fundamental frequency, a range of the fundamental frequency, a mean of the fundamental frequency, and a variety of other statistics.

25 Claims, 17 Drawing Sheets

U.S. PATENT DOCUMENTS

| | | | |
|---|---|---|---|
| 4,592,086 A | 5/1986 | Watari et al. | 381/43 |
| 4,602,129 A | 7/1986 | Matthews et al. | 179/18 |
| 4,696,038 A | 9/1987 | Doddington et al. | 381/38 |
| 4,931,934 A | 6/1990 | Snyder | 364/419 |
| 4,996,704 A | 2/1991 | Brunson | 379/67 |
| 5,163,083 A | 11/1992 | Dowden et al. | 379/88 |
| 5,410,739 A | 4/1995 | Hart | 455/66 |
| 5,461,697 A | 10/1995 | Nishimura et al. | 395/2.41 |
| 5,495,553 A | 2/1996 | Jakatdar | 395/2.6 |
| 5,539,861 A | 7/1996 | DeSimone | 395/2.43 |
| 5,572,576 A | 11/1996 | Klausner et al. | 379/67 |
| 5,647,834 A | 7/1997 | Ron | 600/23 |
| 5,666,400 A | 9/1997 | McAllister et al. | 379/67 |
| 5,704,007 A | 12/1997 | Cecys | 395/2.69 |
| 5,734,794 A | 3/1998 | White | 704/275 |
| 5,774,591 A | 6/1998 | Black et al. | 382/236 |
| 5,774,859 A | 6/1998 | Houser et al. | 704/275 |
| 5,812,977 A | 9/1998 | Douglas | 704/275 |
| 5,860,064 A | 1/1999 | Henton | 704/260 |
| 5,884,247 A | 3/1999 | Christy | 704/7 |
| 5,893,057 A | 4/1999 | Fujimoto et al. | 704/246 |
| 5,897,616 A | 4/1999 | Kanevsky et al. | 704/246 |
| 5,903,870 A | 5/1999 | Kaufman | 704/275 |
| 5,909,665 A | 6/1999 | Kato | 704/241 |
| 5,913,196 A | 6/1999 | Talmor et al. | 704/270 |
| 5,918,222 A * | 6/1999 | Fukui et al. | 707/1 |
| 5,936,515 A | 8/1999 | Right et al. | 340/384.5 |
| 5,987,415 A | 11/1999 | Breese et al. | 704/270 |
| 6,006,188 A | 12/1999 | Bogdashevsky et al. | 704/270 |
| 6,151,571 A | 11/2000 | Petrushin | 704/209 |
| 6,173,260 B1 | 1/2001 | Slaney | 704/250 |
| 6,212,550 B1 | 4/2001 | Segur | 709/206 |
| 6,275,806 B1 | 8/2001 | Petrushin | 704/272 |
| 6,363,346 B1 * | 3/2002 | Walters | 704/231 |
| 6,542,602 B1 | 4/2003 | Elazar | 379/265.06 |
| 6,638,217 B1 | 10/2003 | Liberman | 600/300 |
| 6,795,808 B1 * | 9/2004 | Strubbe et al. | 704/275 |
| 7,181,693 B1 * | 2/2007 | Anderson et al. | 715/745 |
| 2004/0002838 A1 | 1/2004 | Oliver et al. | 703/2 |

FOREIGN PATENT DOCUMENTS

| | | |
|---|---|---|
| EP | 1 222 448 B1 | 10/2006 |
| WO | WO 87/02491 | 4/1987 |
| WO | WO 98/03941 | 1/1998 |
| WO | WO 98/10412 | 3/1998 |
| WO | WO 98/15924 | 4/1998 |
| WO | WO 98/23062 | 5/1998 |
| WO | WO 99/22364 | 5/1999 |
| WO | WO 99/31653 | 6/1999 |
| WO | WO 00/62279 | 10/2000 |
| WO | WO 01/16570 A1 | 3/2001 |
| WO | WO 01/16936 A1 | 3/2001 |
| WO | WO 01/16938 A1 | 3/2001 |
| WO | WO 01/16940 | 3/2001 |

OTHER PUBLICATIONS

Petrushin, V. "Emotion in Speech: Recognition and Application to Call Centers," Artificial Neural Networks in Engineering, Nov. 7-10, 1999.*

Foreign communication/office action dated Dec. 3, 2008 (in Hebrew and English translation citing above U.S. Patent No. 5,572,576) (5p).

Banse, Rainer, et al., "Acoustic Profiles in Vocal Emotion Express," *Journal of Personality and Social Psychology*, 1996, vol. 70, No. 3, pp. 614-636.

Boersma, Paul, "Accurate Short-Term Analysis of the Fundamental Frequency and the Harmonics-to-Noise Ratio of a Sampled Sound," *Institute of Phonetic Sciences, University of Amsterdam, Proceedings 17 (1993)*, pp. 97-110.

Bourjot, C., et al., "Phonetic Decoder Assessment," Eurospeech 89, *European Conference on Speech Communication and Technology*, vol. Two, Sep. 1989, pp. 457-460.

Breiman, Leo, "Bagging Predictors," *Machine Learning*, 24, pp. 23-140 (1996).

Cahn, Janet E., *The Generation of Affect in Synthesized Speech*, M.I.T. Media Technology Laboratory, 1990, pp. 1-19.

Campbell, Jr., Joseph P., et al., *Government Applications and Operations*, Biometric Consortium, http://www.biometrics.org/REPORTS/CTSTG96, 1996.

Chiu, C.C., et al., "The Analysis and Recognition of Human Vocal Emotions," *Proceedings of International Computer Symposium*, Dec. 1994, pp. 83-88.

Cowie, R., et al., "Emotion Recognition in Human-Computer Interaction," *IEEE Signal Processing Magazine*, Jan. 2001, pp. 33-80.

Darby, M.D., John K., editor, *Speech Evaluation in Psychiatry*, Chapter 109, 1981, pp. 189-220.

Dellaert, Frank, et al., "Recognizing Emotion in Speech," 1996, ICSLP 96, *Proceedings, Fourth International Conference on Spoken Language*, vol. 3, pp. 1970-1973.

Elliott, Clark, et al., *Autonomous Agents as Synthetic Characters*, American Association for Artificial Intelligence, Summer 1998, pp. 13-30.

Gadallah, Mahmoud E., et al., "Speech Based Automatic Lie Detection," *16th National Radio Science Conference, NRSC'99*, Ain Shams University, Feb. 23-25, 1999, pp. C33/1-C33/8.

Hansen, John H.L., *Analysis and compensation of speech under stress and noise for environmental robustness in speech recognition*, Speech Communication 20 (1996), pp. 151-173.

Hansen, Lars Kai, "Neutral Network Ensembles," *IEEE Transactions on Pattern Analysis and Machine Intelligence*, vol. 12, No. 10, Oct. 1990, pp. 993-1001.

Hays, Ronald J., *INS Passenger Accelerated Service System (INSPASS)*, Biometric Consortium; http://www.biometrics.org/REPORTS/INSASS.html, 1996.

Jimenez-Fernandez, Alfonso, et al., "Pattern Recognition in the Vocal Expression of Emotional Categories," *IEEE Ninth Annual Conference of the Engineering in Medicine and Biology Society*, 1987, pp. 2090-2091.

Klasmeyer, Gudrun, "The Perceptual Importance of Selected Voice Quality Parameters," *IEEE International Conference on Acoustics, Speech and Signal Processing*, vol. 3, Apr. 21-24, 1997, pp. 1615-1618.

Kononenko, Igor, *Estimating Attributes: Analysis and Extensions of RELIEF*, University of Ljubljana, Faculty of Electrical Engineering & Computer Science, 1994, pp. 171-182.

Lee, Chul Min, et al., "Toward Detecting Emotions in Spoken Dialogs", *IEEE Transactions on Speech and Audio Processing*, vol. 13, No. 2, Mar. 2005, pp. 293-303.

Makarova, V. and Petrushin, V.A., "Vowel Quality in Emotional Speech," *Proc. 10th International Conference on Speech and Computer*, Patras, Greece, pp. 449-454 (2005).

Mayer, David L., et al., "Development of a Speech Analysis Protocol for Accident Investigation," *Abstract and Proceedings of the 38th Annual Meeting of the Human Factors and Ergonomic Society*, vol. 1, Oct. 24-28, 1994, pp. 124-127.

Moriyama, Tsuyoshi, et al., "Emotion Recognition and Synthesis System on Speech," 1999 *IEEE*, pp. 840-844.

Murray, Iain R., et al., "Toward the simulation of emotion in synthetic speech: A review of the literature on human vocal emotion," *J. Acoust. Soc. Am.* 93 (2), Feb. 1993, pp. 1097-1108.

Oliver, Gina M., *A Study of the Use of Biometrics as it Relates to Personal Privacy Concerns*, 1999, http://nile.ed.umuc.edu/~jmeinke/inss690/oliver/Oliver-690.html.

Parmanto, Bambang, et al., *Improving Committee Diagnosis with Resampling Techniques*, Department of Information Science, University of Pittsburgh, 1996, pp. 882-888.

Petrushin, V.A. and Makarova, V., *Parameters of Fricatives and Affricates in Russian Emotional Speech*, Proc. 11th International Conference on Speech and Computer, Saint-Petersburg, Russia, pp. 73-80 (2006).

Polzin, Thomas S., et al., "Detecting Emotions in Speech," *Proceedings of the CMC 1998*, School of Computer Science, Carnegie Mellon University, Pittsburgh, http://www.ri.cmu.edu/pubs/pub_2161.html.

Polzin, Thomas S., et al., "Pronunciation Variations in Emotional Speech," ESCA-98, *Tutorial and Research Workshop on Modeling Pronunciation Variation for Automatic Speech Recognition*, May 1998, Interactive Systems Laboratories, Carnegie Mellon University, Pittsburgh, http://www.ri.cmu.edu/pubs/pub_2160.html.

Scherer, Klaus R., et al., "Vocal Cues in Emotion Encoding and Decoding," *Motivation and Emotion*, vol. 15, No. 2, 1991, pp. 123-148.

Slaney, Malcolm, et al., "Baby Ears: a recognition system for affective vocalizations," 1998 *IEEE, International Conference on Acoustics, Speech and Signal Processing*, vol. 2, pp. 985-988.

Talbot, David, "Prosody," *Technology Review*, Jul./Aug. 2002, p. 27.

Tosa, Naoko, et al., *Life-like Communication Agent*, MIC & MUSE, 1996, pp. 1-15, http://www.mic.atr.co.jp/~tosa.

*Webster's New World Dictionary of American English* (Third College Ed. 1988) definition of "pre" (relied on by the Examiner in U.S. Appl. No. 09/833,301), p. 1060.

Yamada, Toyotoshi, et al., "Pattern recognition of emotion with Neural Network," 1995 IEEE, *Proceedings of IECON 21$^{st}$ International Conference on Industrial Electronics, Control and Instrumentation*, vol. 1, pp. 183-187.

\* cited by examiner

DETECTING EMOTIONS USING VOICE SIGNAL ANALYSIS

This is a continuation of U.S. patent application Ser. No. 10/194,908, filed Jul. 12, 2002, now U.S. Pat. No. 7,222,075, which is a continuation-in-part of U.S. application Ser. No. 09/833,301, filed Apr. 10, 2001, which is a continuation of U.S. patent application Ser. No. 09/388,909, filed Aug. 31, 1999, now U.S. Pat. No. 6,275,806, which are herein incorporated by reference in their entirety.

FIELD OF THE INVENTION

The present invention relates to analysis of speech and more particularly to detecting emotion using statistics and neural networks to classify speech signal parameters according to emotions the networks have been taught to recognize.

BACKGROUND OF THE INVENTION

Although the first monograph on expression of emotions in animals and humans was written by Charles Darwin in the nineteenth century and psychologists have gradually accumulated knowledge in the field of emotion detection and voice recognition, it has attracted a new wave of interest recently by both psychologists and artificial intelligence specialists. There are several reasons for this renewed interest, including technological progress in recording, storing and processing audio and visual information, the development of non-intrusive sensors, the advent of wearable computers; and the urge to enrich human-computer interfaces from point-and-click to sense-and-feel. Further, a new field of research in Artificial Intelligence (AI) known as affective computing has recently been identified. Affective computing focuses research on computers and emotional states, combining information about human emotions with computing power to improve human-computer relationships.

As to research on recognizing emotions in speech, psychologists have done many experiments and suggested many theories. In addition, AI researchers have made contributions in the areas of emotional speech synthesis, recognition of emotions, and the use of agents for decoding and expressing emotions.

A closer look at how well people can recognize and portray emotions in speech is revealed in Tables 1-4. Thirty subjects of both genders recorded four short sentences with five different emotions (happiness, anger, sadness, fear, and neutral state or normal). Table 1 shows a performance confusion matrix, in which only the numbers on the diagonal match the intended (true) emotion with the detected (evaluated) emotion. The rows and the columns represent true and evaluated categories respectively. For example, the second row indicates that 11.9% of utterances that were portrayed as happy were evaluated as neutral (unemotional), 61.4% as truly happy, 10.1% as angry, 4.1% as sad, and 12.5% as afraid. The most easily recognizable category is anger (72.2%) and the least recognizable category is fear (49.5%). There is considerable confusion between sadness and fear, sadness and unemotional state, and happiness and fear. The mean accuracy of 63.5% (diagonal numbers divided by five) agrees with results of other experimental studies.

TABLE 1

Performance Confusion Matrix

| Category | Neutral | Happy | Angry | Sad | Afraid | Total |
|---|---|---|---|---|---|---|
| Neutral | 66.3 | 2.5 | 7.0 | 18.2 | 6.0 | 100 |
| Happy | 11.9 | 61.4 | 10.1 | 4.1 | 12.5 | 100 |
| Angry | 10.6 | 5.2 | 72.2 | 5.6 | 6.3 | 100 |
| Sad | 11.8 | 1.0 | 4.7 | 68.3 | 14.3 | 100 |
| Afraid | 11.8 | 9.4 | 5.1 | 24.2 | 49.5 | 100 |

Table 2 shows statistics for evaluators for each emotional category and for summarized performance that was calculated as the sum of performances for each category. It can be seen that the variance for anger and sadness is much less then for the other emotional categories.

TABLE 2

Evaluators' Statistics

| Category | Mean | Std. Dev. | Median | Minimum | Maximum |
|---|---|---|---|---|---|
| Neutral | 66.3 | 13.7 | 64.3 | 29.3 | 95.7 |
| Happy | 61.4 | 11.8 | 62.9 | 31.4 | 78.6 |
| Angry | 72.2 | 5.3 | 72.1 | 62.9 | 84.3 |
| Sad | 68.3 | 7.8 | 68.6 | 50.0 | 80.0 |
| Afraid | 49.5 | 13.3 | 51.4 | 22.1 | 68.6 |
| Total | 317.7 | 28.9 | 314.3 | 253.6 | 355.7 |

Table 3 below shows statistics for "actors", i.e. how well subjects portray emotions. Speaking more precisely, the table shows how readily a particular portrayed emotion is recognized by evaluators. It is interesting to compare tables 2 and 3 and see that the ability to portray emotions (total mean is 62.9%) at about the same level as the ability to recognize emotions (total mean is 63.2%). However, the variance for portraying and emotion is much larger.

TABLE 3

Actors' Statistics

| Category | Mean | Std. Dev. | Median | Minimum | Maximum |
|---|---|---|---|---|---|
| Neutral | 65.1 | 16.4 | 68.5 | 26.1 | 89.1 |
| Happy | 59.8 | 21.1 | 66.3 | 2.2 | 91.3 |
| Angry | 71.1 | 24.5 | 78.2 | 13.0 | 100.0 |
| Sad | 68.1 | 18.4 | 72.6 | 32.6 | 93.5 |
| Afraid | 49.7 | 18.6 | 48.9 | 17.4 | 88.0 |
| Total | 314.3 | 52.5 | 315.2 | 213 | 445.7 |

Table 4 shows self-reference statistics, i.e. how well subjects were able to recognize their own portrayals. We can see that people do much better in recognizing their own emotions (mean is 80.0%), especially for anger (98.1%), sadness (80.0%) and fear (78.8%). Interestingly, fear was recognized better than happiness. Some subjects failed to recognize their own portrayals for happiness and the normal or neutral state.

TABLE 4

Self-reference Statistics

| Category | Mean | Std. Dev. | Median | Minimum | Maximum |
|---|---|---|---|---|---|
| Neutral | 71.9 | 25.3 | 75.0 | 0.0 | 100.0 |
| Happy | 71.2 | 33.0 | 75.0 | 0.0 | 100.0 |
| Angry | 98.1 | 6.1 | 100.0 | 75.0 | 100.0 |
| Sad | 80.0 | 22.0 | 81.2 | 25.0 | 100.0 |

TABLE 4-continued

| | Self-reference Statistics | | | | |
|---|---|---|---|---|---|
| Category | Mean | Std. Dev. | Median | Minimum | Maximum |
| Afraid | 78.8 | 24.7 | 87.5 | 25.0 | 100.0 |
| Total | 400.0 | 65.3 | 412.5 | 250.0 | 500.0 |

These results provide valuable insight about human performance and can serve as a baseline for comparison to computer performance. In spite of the research on recognizing emotions in speech, little has been done to provide methods and apparatuses that utilize emotion recognition for business purposes.

SUMMARY OF THE INVENTION

One embodiment of the present invention is a method of detecting emotional states. The method comprises providing speech signals, dividing the speech signals into at least one of segments, frames and subframes. The method also includes extracting acoustic features from the speech signals, and calculating statistics from the acoustic features. The statistics serve as inputs to a classifier, which can be represented as a computer program, a device or a combination of both. The method also includes classifying speech signals with at least one neural network classifier as belonging to at least one emotional state, and storing the speech signals and the emotional states in a storage medium, in a manner to allow later retrieval of the stored speech signals and emotional states. The method also includes outputting an indication of the at least one emotional state in a human-recognizable format. The at least one neural network classifier is taught to recognize at least one emotional state from a finite number of emotional states.

Another embodiment of the invention is a system for classifying speech. The system comprises a computer system having a central processing unit (CPU), an input device, at least one memory for storing data indicative of speech signals, and an output device. The computer system also comprises logic for receiving and analyzing speech signals, logic for dividing the speech signals, and logic for extracting at least one feature from the speech signals. The system comprises logic for calculating statistics of the speech, and logic for at least one neural network for classifying the speech as belonging to at least one of a finite number of emotional states. The system also comprises logic for storing the speech signals and the emotional states in a storage medium, in a manner to allow later retrieval of the stored speech signals and emotional states, and logic for outputting an indication of the at least one emotional state.

Another embodiment of the invention is a system for detecting emotional states in a voice signal. The system comprises a speech reception device, and at least one computer connected to the speech reception device. The system further comprises at least one memory operably connected to the at least one computer, and a computer program including at least one neural network for dividing the voice signals into a plurality of segments, and for analyzing the voice signals according to features of the segments to detect the emotional states in the voice signals. The system also comprises a database of speech signal features and statistics accessible to the computer for comparison with features of the voice signals, and an output device coupled to the computer for notifying a user of the emotional state detected in the voice signals.

These and many other aspects of the invention will become apparent through the following drawings and detailed description of embodiments of the invention, which are meant to illustrate, but not the limit the embodiments thereof.

DESCRIPTION OF THE DRAWINGS

The invention will be better understood when consideration is given to the following, detailed description thereof. Such description makes reference to the attached drawings wherein.

DETAILED DESCRIPTION

The present invention is directed towards recognizing emotions in speech, which may have useful and valuable applications for business purposes. Recognizing emotions may help call-center personnel deal with angry or emotional callers. Knowing a customer or caller's emotional state may help operators deal with callers who are angry or excited. Conversely, detecting little emotion in a caller in whom excitement or happiness is expected may also prove useful. Detecting other emotions, such as nervousness or fear, may alert businesses to persons who may be attempting to cheat or defraud them. There are many business uses for a system or a method that detects emotions in persons.

Some embodiments of the present invention may be used to detect the emotion of a person based on a voice analysis and to output the detected emotion of the person. Other embodiments of the present invention may be used for the detecting the emotional state of a caller in telephone call center conversations, and for providing feedback to an operator or a supervisor for monitoring purposes. Other embodiments of the present invention may be used for classifying voice mail messages according to the emotions expressed by a caller. Yet other embodiments of the present invention may be used for emotional training of several categories of people, including call center operators, would-be dramatic actors, and people suffering from autism. Another area of application for embodiments of the present invention is in detecting nervousness or fear in a business environment.

In accordance with at least one embodiment of the present invention, a system is provided for voice processing and analysis. The system may be enabled using a hardware implementation such as that illustrated in FIG. 1. Further, various functional and user interface features of one embodiment of the present invention may be enabled using logic contained in software. The software may reside in one or more computers or memories operably connected to the computers. The computers may be full-size computers, mini-computers, desk-top sized computers, microcomputers, digital signal processors (DSPs) or computer microprocessors. The programming or logic may reside in such a computer or in a memory accessible to the computer. The processes and methods described below are meant to be implemented for the most part with computer software, and embodiments of the invention include the software and the logic embedded within the software.

Hardware Overview

Figure 1:
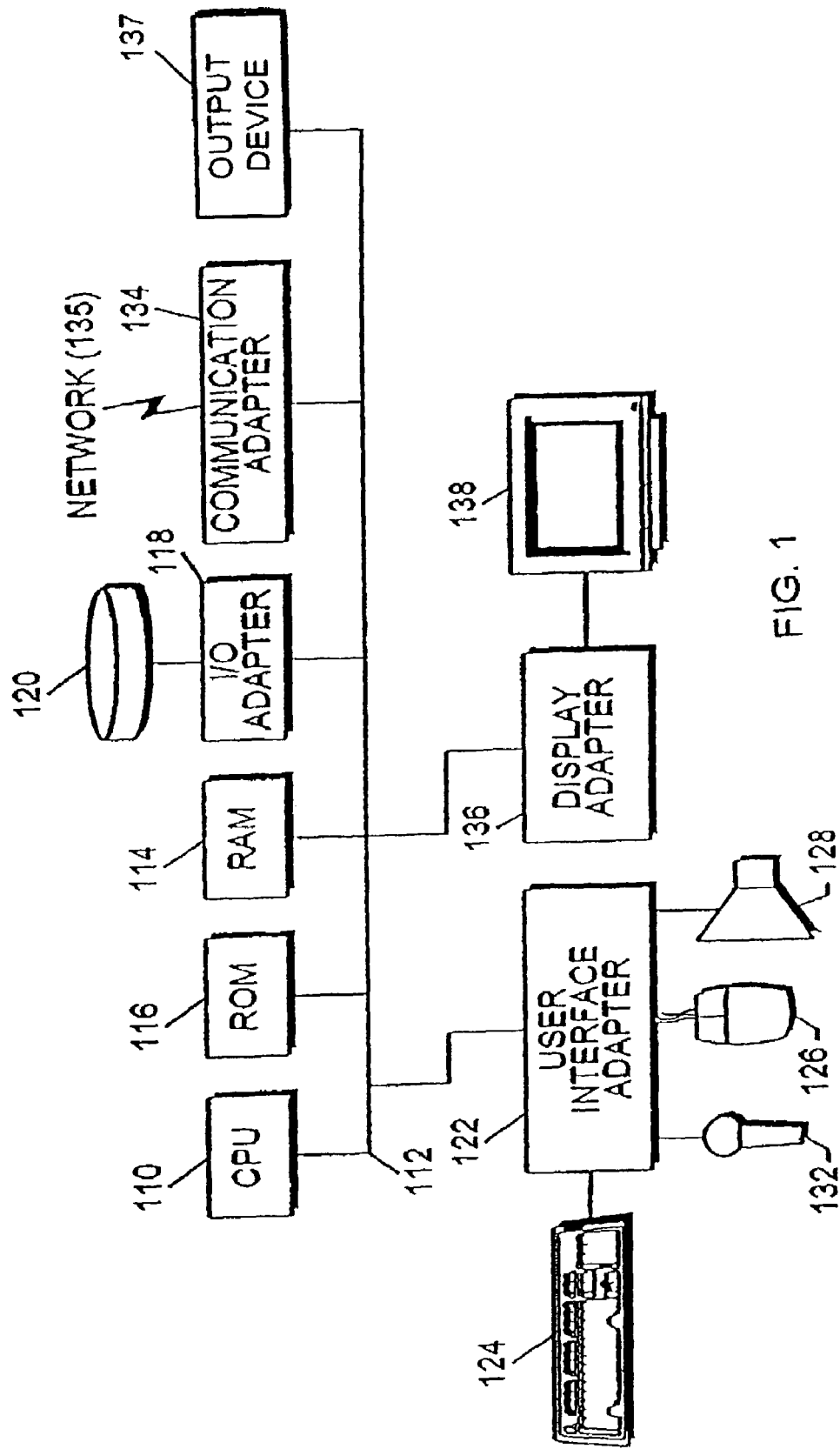
FIG. 1 is a schematic diagram of a hardware implementation of one embodiment of the present invention.

A representative hardware environment of a preferred embodiment of the present invention is depicted in FIG. 1, which illustrates a typical hardware configuration of a workstation having a central processing unit 110, such as a microprocessor, and a number of other units interconnected via a system bus 112. The workstation shown in FIG. 1 includes Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to an output device 137 or display device 138. The communication network may be a voice-mail center, a call center, an e-mail router, or a customer service center. Alternatively, the system and its logic may connect to a manager or to emergency response personnel. The output device may be a printer, an additional video output such as a flashing light, a device for outputting an audible tone, or even a relay or an alarm. The workstation typically has resident thereon an operating system such as Microsoft Windows operating system, an Apple MacIntosh operating system, or a Unix operating system.

Emotion Rocognition

The present invention uses a data-driven approach for creating an emotion recognition system. This choice is motivated by knowing the complexity of the emotional expression among different languages, cultural traditions, and age differences among targeted users. Moreover, the characteristics of a speech signal are heavily dependent on the equipment and procedures used for the acquisition and digitizing of the speech signal.

Figure 2A:
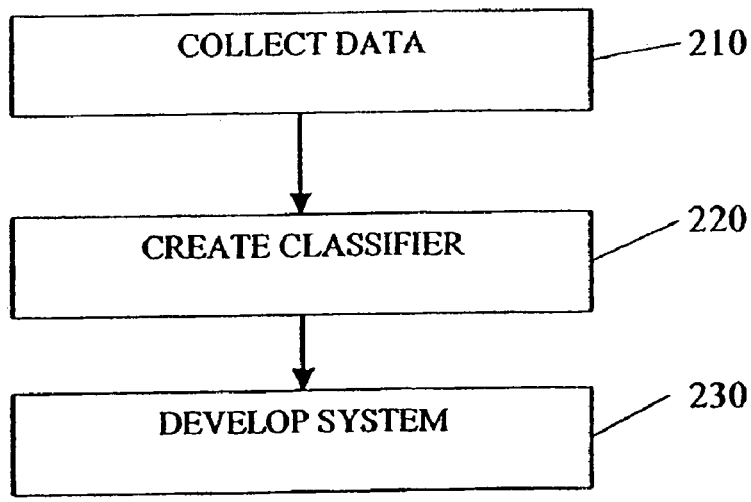
FIGS. 2a and 2b are flowcharts depicting the stages of creating an emotion recognition system and the steps of the data collection stage.

Steps in creating the emotion recognition system are depicted in FIG. 2a. The steps include collecting data 210, creating a classifier 220, and developing a decision-making system 230. The process starts with selection of a number of different emotional states, which it is desired that the system should recognize. The typical sets of emotional states include the so-called basic emotions: happiness, anger, sadness, fear and neutral (unemotional) state. For some business applications, it may be enough to recognize only angry customers; in this case, there may be only two states, "angry" and "non-angry". Other applications may include more emotional states than the set of basic emotions, such as surprise and disgust. In general, more data is required and the accuracy of the recognizer decreases when more emotional states are considered. Other emotional states besides the ones listed in the examples below may also be detected by following this same process for collecting and classifying data on the particular emotion of interest.

Figure 2B:
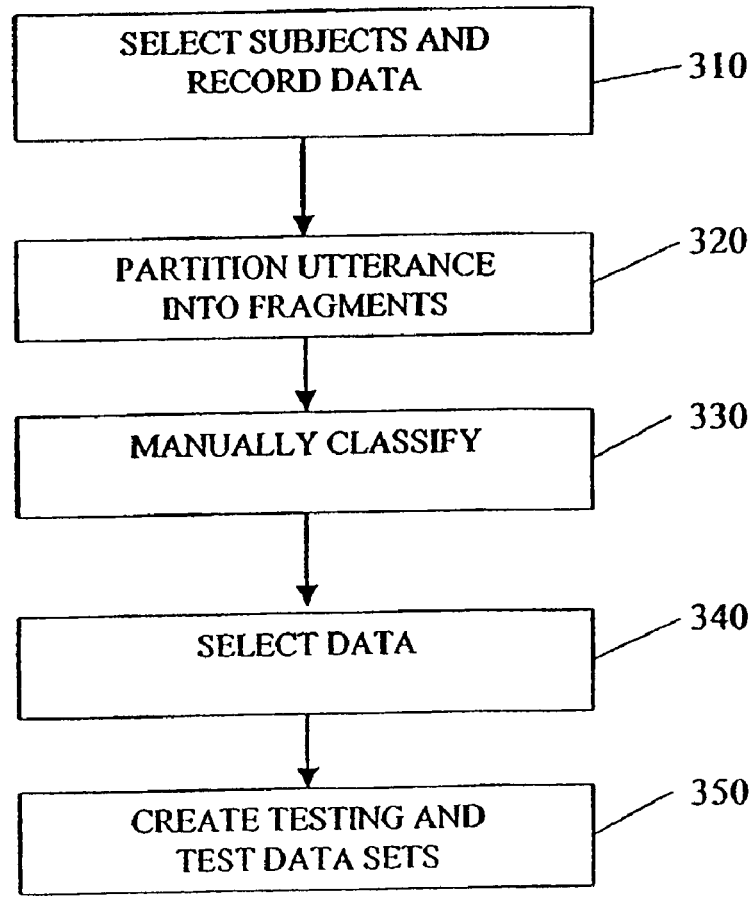

The data collection stage includes the steps depicted in FIG. 2b. First, test subjects should be selected from a group for which analysis is desired, and data should be solicited from test subjects and recorded using the target equipment 310. Then the recorded utterances are partitioned into from 1-second to 3-second fragments using an algorithm (see below) that is used for partitioning sample utterances (speech signals) 320. These utterances are labeled manually, or identified, as particular emotions by a group of experts 330. A set of reliable utterances for each emotional state is selected based on the experts' classification 340. The selected utterances are randomly divided into two parts in proportion 3:1 or 2:1. These parts serve as training and test data for creating a classifier 350.

Figure 3:
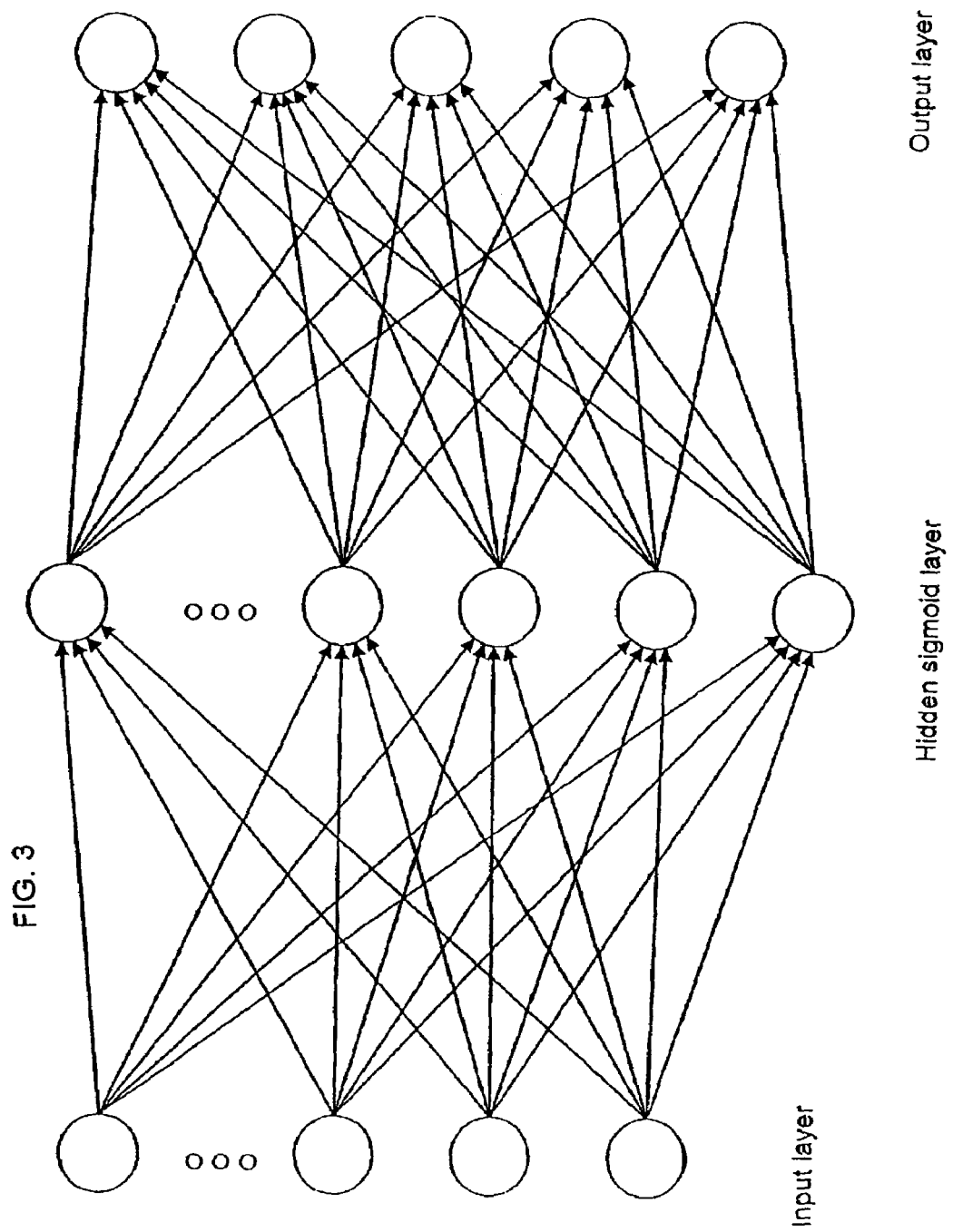
FIG. 3 is a schematic representation of a neural network according to the present invention.

FIG. 3 is a neural network 355 useful in detecting an emotion. The particular network depicted in FIG. 3 is a 3-stage neural network with a hidden sigmoid layer. In a preferred embodiment, the input layer 360 may have 8, 10 or 14 input layers, corresponding to the 8, 10 or 14 statistics calculated from voice signal parameters. Parameters such as fundamental frequency, energy, formants, speaking rate and the like, may be extracted from the voice signal. The term "feature" refers to a statistic of a speech signal parameter that is calculated from a speech segment or fragment. The input layers are distributed among a hidden sigmoid (non-linear) layer 370, and the results are output by an output layer 380 which may be linear.

Figure 4:
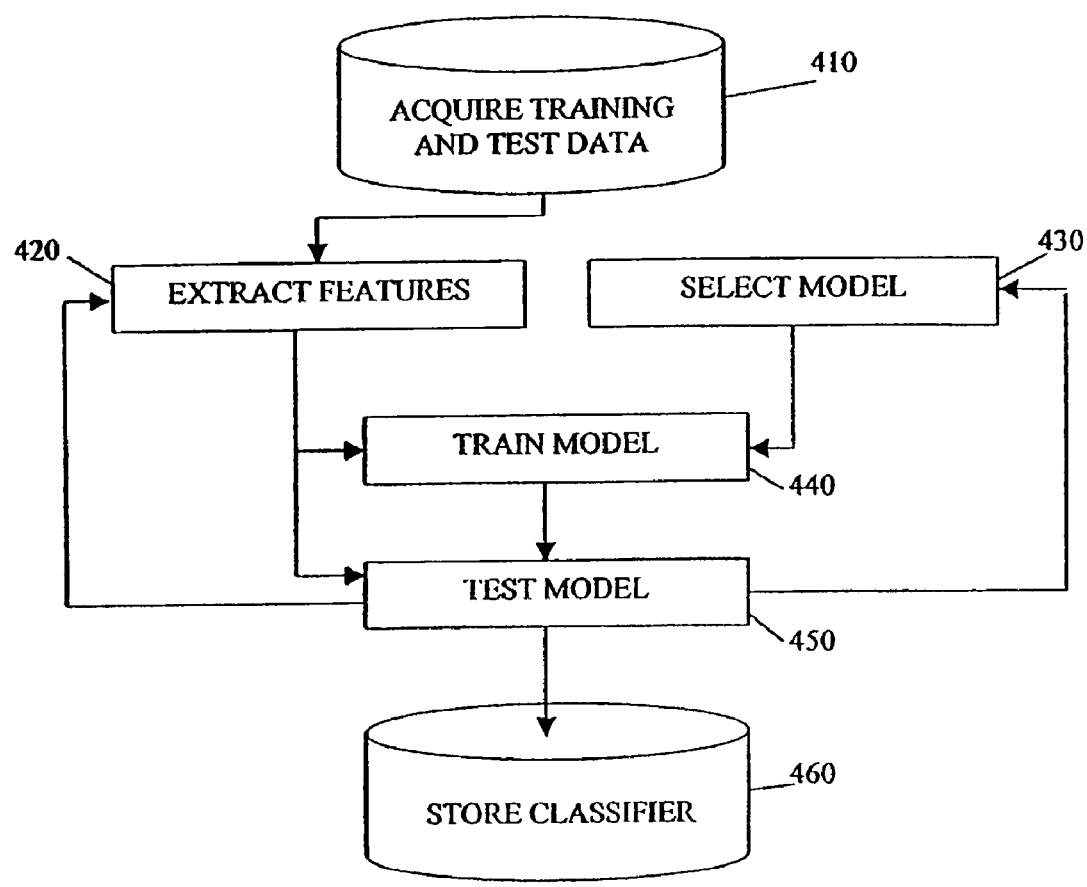
FIG. 4 is a flowchart depicting the steps of creating a classifier.

The stage of creating a classifier consists of the steps shown in FIG. 4. First, training and test data sets are acquired 410. Second, acoustic parameters, such as fundamental frequency (pitch), energy, formants, speaking rate, and the like, are extracted and features are evaluated 420 for each speech segment. Third, a classification model is selected 430. In the embodiments of the present invention, the following models were used (see below): k-nearest neighbor, back propagation neural networks, and ensembles of neural network classifiers. K-nearest neighbor is a method of classifying an object based on characteristics of its nearest neighbor. Fourth, the model is trained on the training set of data 440, and tested on the test set 450. Finally, if the classifier 460 shows an accuracy that satisfies the system requirements, the process is stopped and the classifier is stored, ready for use. Otherwise, a new model is selected or more data collected and the process is repeated.

Figure 5:
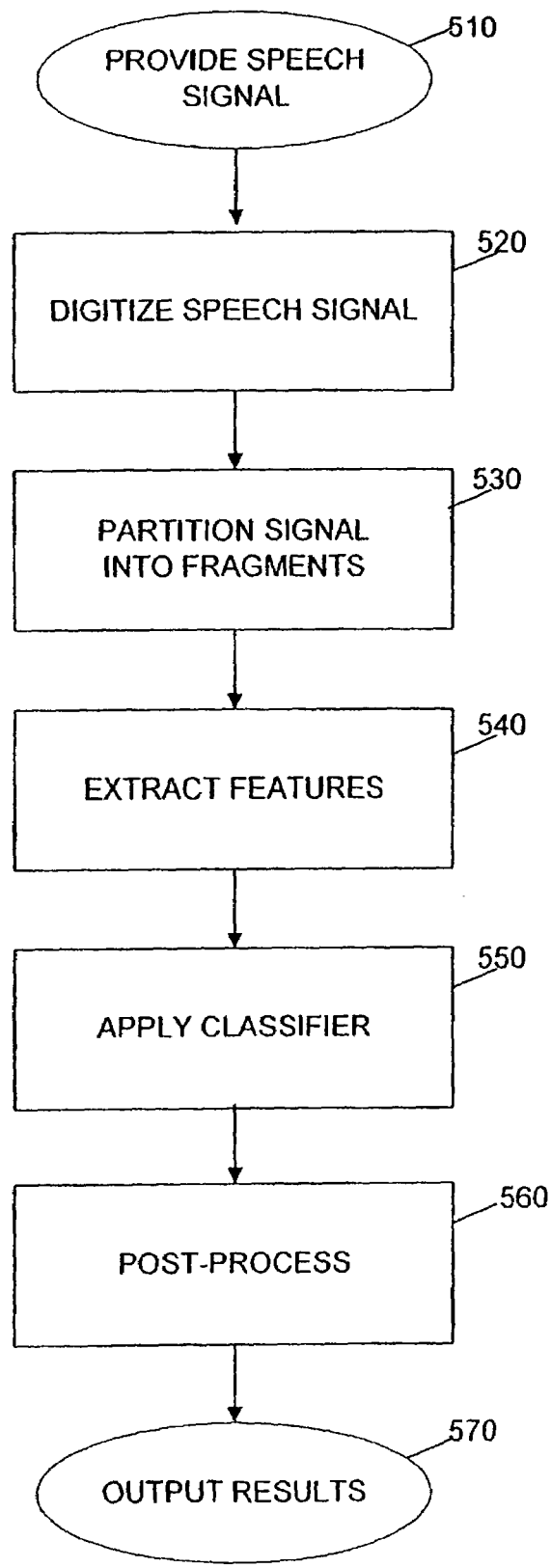
FIG. 5 is a flowchart for developing and using a system for detecting emotions.

The system development stage includes the following steps. The classifier is embedded into a system using interfaces. In the embodiments of the present invention, the process depicted in FIG. 5 was used. A speech signal 510 is digitized 520. Then it is partitioned into from 1-second to 3-second fragments or segments 530. For each fragment the features are extracted 540, the classifier is applied 550, and the outputs are stored. Then a post-processing routine 560 processes the outputs for summarization or extraction of needed information 570. After the classifier is embedded, the system is developed and tested in accordance with any suitable software engineering approach. Once the system has been developed, it may be utilized.

In one aspect of the present invention, the classifier includes probabilities of particular voice features being associated with an emotion. Preferably, the selection of the emotion using the classifier includes analyzing the probabilities and selecting the most probable emotion based on the probabilities. Optionally, the probabilities may include performance confusion statistics, such as are shown in the performance confusion matrix, above in Table 1. Additionally, the statistics may include self-recognition statistics, as shown above in Table 4.

Partitioning the Speech Signal

To train and test a classifier, the input speech signal is partitioned into fragments or segments, which ideally should correspond to phrases. Experimental research has demonstrated that phrases of conversational English have a length of from 1 second to 3 seconds. An algorithm for partitioning the speech signal into segments uses energy values to detect speech segments and select phrases. The algorithm works in the following manner. First, an energy value is calculated for each fragment of a length of 20 milliseconds. Then the values are compared to a threshold to detect speech segments. A median filter is applied to the resulting binary vector to smooth the vector. After this step, the algorithm finds the beginning of a speech signal and considers a speech segment of length 4 seconds starting from this point. For this segment, the largest pause lying in the interval from 1 second to 3 seconds is detected and the segment is cut at this pause. If no pauses are found then, a segment 3 seconds long is selected. The process continues for the rest of the signal. The signals may be further divided into frames, typically from about 20 to about 40 milliseconds long, and subframes, typically about 10 to about 20 milliseconds long. Other lengths of time, longer or shorter, may be used for segments, frames and subframes.

Feature Extraction

It has been found that pitch is the main vocal cue for emotion recognition. Pitch is represented by the fundamental frequency (F0) of the speech sample, i.e. the lowest frequency of the vibration of the vocal folds. Other acoustic variables contributing to vocal emotion signaling include the following: energy or amplitude of the speech signal; frequency spectrum; formants and temporal features, such as duration; and pausing. Another approach to feature extraction is to enrich the set of features by considering some derivative features, such as the linear predictive coding (LPC) cepstrum coefficients, mel-frequency cepstrum coefficients (MFCC) or features of the smoothed pitch contour and its derivatives. In experimental work, the features of prosodic (suprasegmental) acoustic features, such as fundamental frequency, duration, formants, and energy were used.

There are several approaches to calculating F0. In one of the embodiments of this invention, a variant of the approach proposed by Paul Boersma was used. More details on the algorithm are set forth in the publication Proc. Inst. for Phonetic Sciences, University of Amsterdam, vol. 17 (1993), pp. 97-110, in an article by Paul Boersma entitled, "Accurate Short-Term Analysis of the Fundamental Frequency and the Harmonic-to-Noise Ratio of a Sampled Sound," which is herein incorporated by reference. To calculate the fundamental frequency the speech signal is divided into a plurality of overlapped frames. Each frame is 40 milliseconds long and the next frame overlaps the previous one by 30 milliseconds. The fundamental frequency is calculated only for the voiced part of an utterance. Additionally, for F0 the slope can be calculated as a linear regression for the voiced part of speech, i.e. the line that fits the pitch contour. Subframes may be selected to have one or more lengths.

Formants are the resonances of the vocal tract. Their frequencies are higher than the basic frequency. The formants are enumerated in ascending order of their frequencies. For one of the embodiments of this invention, the first three formants (F1, F2, and F3) and their bandwidths (BW1, BW2, and BW3) were estimated using an approach based on picking peaks in the smoothed spectrum obtained by LPC analysis, and solving for the roots of a linear predictor polynomial. Formants are calculated for each 20-millisecond subframe, overlapped by 10 milliseconds. Energy is calculated for each 10-millisecond subframe as a square root of the sum of squared samples. The relative voiced energy can also be calculated as the proportion of voiced energy to the total energy of utterance. The speaking rate can be calculated as the inverse of the average length of the voiced part of utterance.

For a number of voice features, the following statistics can be calculated: mean, standard deviation, minimum, maximum and range. Statistic selection algorithms can be used to estimate the importance of each statistic. In experimental work, the RELIEF-F algorithm was used for selection. The RELIEF-F has been run for the data set, varying the number of nearest-neighbors from 1 to 12, and the features ordered according to their sum of ranks. The top 14 statistics are the following: F0 maximum, F0 standard deviation, F0 range, F0 mean, BW1 mean, BW2 mean, energy standard deviation, speaking rate, F0 slope, F1 maximum, energy maximum, energy range, F2 range, and F1 range. To investigate how sets of statistics influence the accuracy of emotion recognition algorithms, three nested sets of statistics may be formed based on their sum of ranks. The first set includes the top eight statistics (from F0 to maximum speaking rate), the second set extends the first set by the two next statistics (F0 slope and F1 maximum), and the third set includes all 14 top statistics. More details on the RELIEF-F algorithm are set forth in the publication Proc. European Conf. On Machine Learning (1994), pp. 171-182, in the article by I. Kononenko entitled, "Estimating attributes: Analysis and extension of RELIEF," which is herein incorporated by reference.

Classifier Creation

A number of models may be used to create classifiers for recognizing emotion in speech. In experimental work for the present invention, the following models have been used: nearest neighbor, back propagation neural networks, and ensembles of classifiers. The input vector to a classifier consists of 8, 10 or 14 elements or statistics, depending on the set of elements used. The vector input to a classifier thus may consist of 8 statistics, including a maximum value of a fundamental frequency, a standard deviation of the fundamental frequency, a range of the fundamental frequency, a mean of the fundamental frequency, a mean of a bandwidth of a first formant, a mean of a bandwidth of a second formant, an energy standard deviation, and a speaking rate. If the vector input to a classifier consists of ten elements or statistics, they may include the above eight, and in addition, a slope of a fundamental frequency and a maximum of a first formant. Finally, if the vector input classifier consists of fourteen statistics, they may include the above ten statistics, and in addition, an energy maximum, an energy range, a first formant range, and a second formant range.

Figure 6:
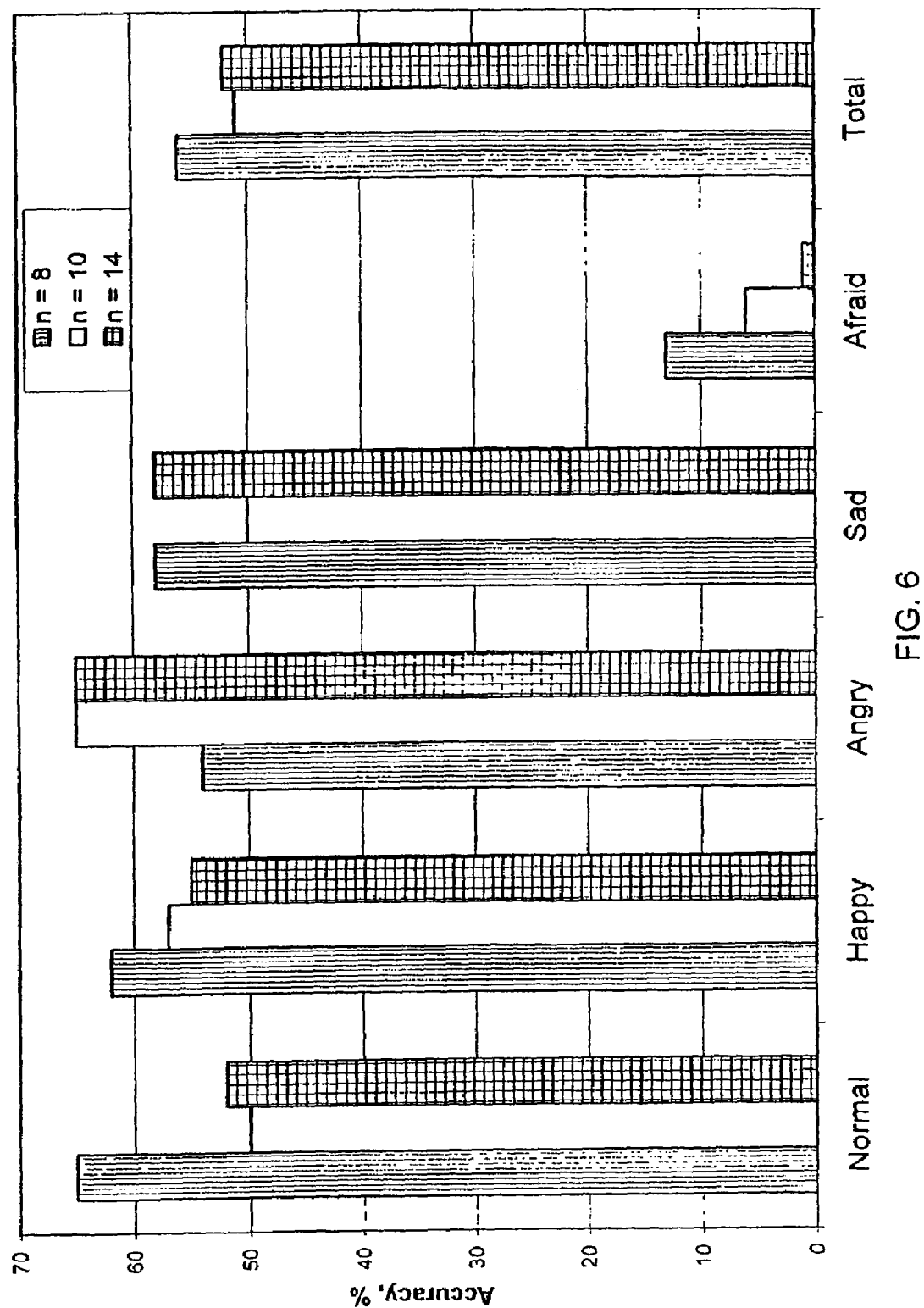
FIG. 6 is a graph showing the average accuracy of recognition for the nearest neighbor classifier.

FIG. 6 shows the average accuracy of recognition for the nearest neighbor classifiers across the number of nearest neighbors and all three statistics sets. The algorithm has been run for a number of neighbors from 1 to 15 and for 8, 10 or 14 statistics. The best average accuracy of recognition (.about.55%) can be reached using 8 statistics, but the average accuracy for anger is much higher (.about.65%) for 10 and 14-statistic sets. All classifiers performed very poorly for fear (about 5-10%). The total average accuracy of this approach is about 51-55%. The accuracy of this approach could be improved if it were based on a larger database populated with an equal number of samples for each emotional state.

A two-layer back propagation neural network architecture was used to create neural network classifiers. A classifier has an 8-, 10- or 14-element (statistics) input vector, with 10 or 20 nodes in the hidden sigmoid layer and five nodes in the output linear layer. The number of outputs corresponds to the number of emotional categories. Several neural network classifiers were trained on the training data set using different initial weight matrices for the neural network. This approach, when applied to the test data set and the 8-statistic set above, gave an average accuracy of about 65% with the following distribution for emotional categories: normal state, 55-65%; happiness, 60-70%; anger, 60-80%; sadness, 60-70%; and fear, 25-50%.

Ensembles of neural network classifiers also have been used. An ensemble consists of an odd number of neural network classifiers, which have been trained on different subsets of the training set using the bootstrap aggregation and cross-validated committee techniques. Bootstrap aggregation involves taking a number of "bootstrap" replicates of the training set and deriving from each one classification predictions for the entire test set and averaging them over all the bootstrap replicates. Another technique that has proven useful is the use of "cross-validated committees." In this technique, overlapping training sets may be constructed by leaving out a different feature or parameter in each set. The sets so constructed are then compared. The ensemble makes decisions based on a majority voting principle. Suggested ensemble sizes are from 7 to 25.

Figure 7:
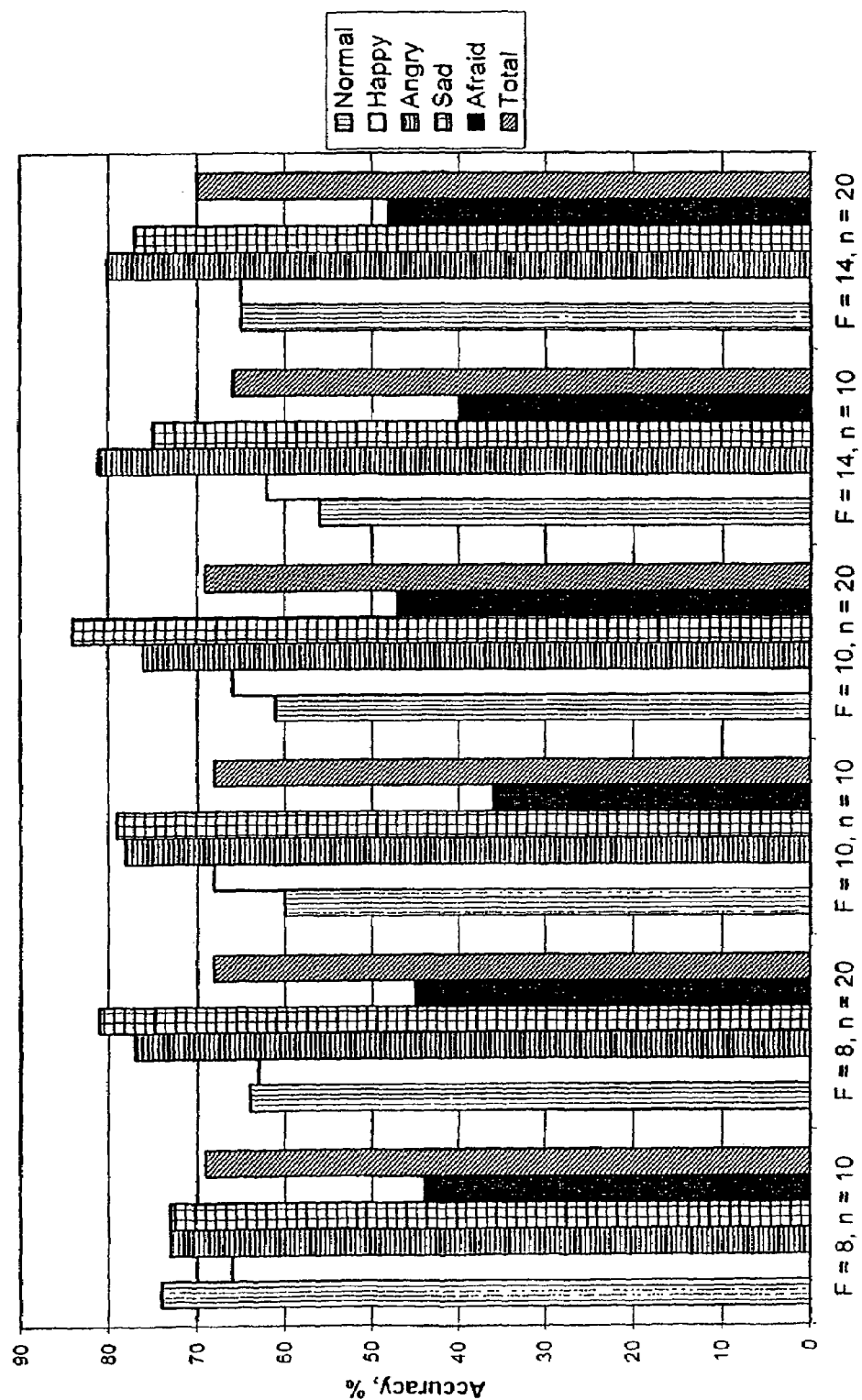
FIG. 7 is a graph showing the average accuracy of recognition for an ensemble of neural network classifiers.

FIG. 7 shows the average accuracy of recognition for ensembles of 15 neural networks, the test data set, all three sets of features (using 8, 10 or 14 statistics), and both neural network architectures (10 and 20 neurons in the hidden layer). We can see that the accuracy for happiness stays the same (.about.65%) for the different sets of features and architectures. The accuracy for fear is relatively low (35-53%). The accuracy for anger starts at 73% for the 8-feature set and increases to 81% the 14-feature set. The accuracy for sadness varies from 73% to 83% and achieves its maximum for the 10-feature set. The average total accuracy is about 70%.

Figure 8:
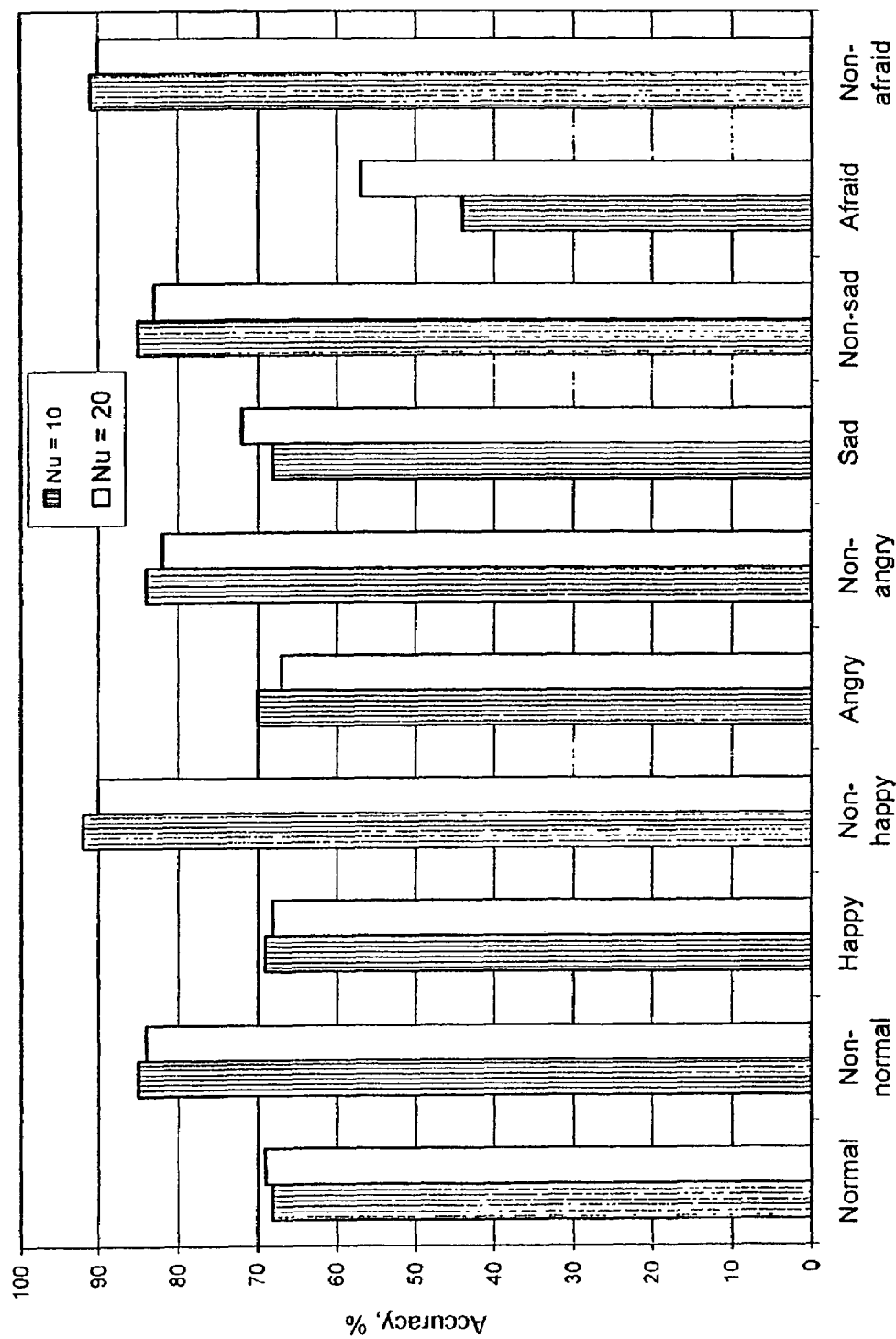
FIG. 8 is a graph showing the average accuracy of recognition for expert neural network classifiers.

The last approach is based on the following idea. Instead of training a neural network to recognize all emotions, build a set of specialists or experts that can recognize only one emotion and then combine their results to classify a given sample. To train the experts, a two-layer back-propagation neural network architecture was used. This architecture has an 8-element input vector, 10 or 20 nodes in the hidden sigmoid layer, and one node in the output linear layer. The same training and test sets were used but with only two classes (for example, angry and non-angry). FIG. 8 shows the average accuracy of emotion recognition for this approach. It is about 70%, except for fear, which is about 44% for the 10-neuron, and .about.56% for the 20-neuron architecture. The accuracy of non-emotional states (non-angry, non-happy, and the like) is 85-92%.

Figure 9:
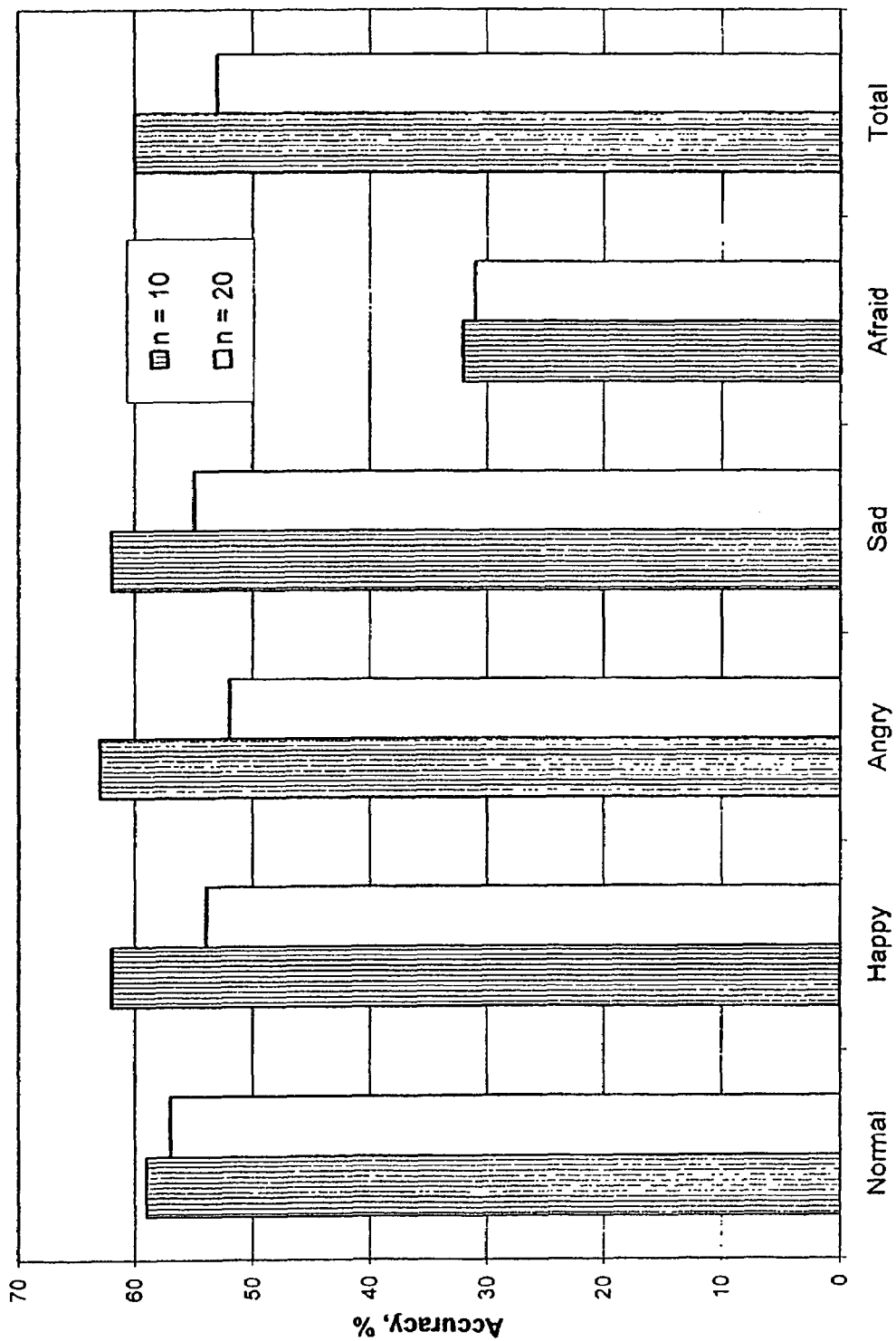
FIG. 9 is a graph showing the average accuracy of recognition for a set of expert neural network classifiers with a simple rule.
Figure 10:
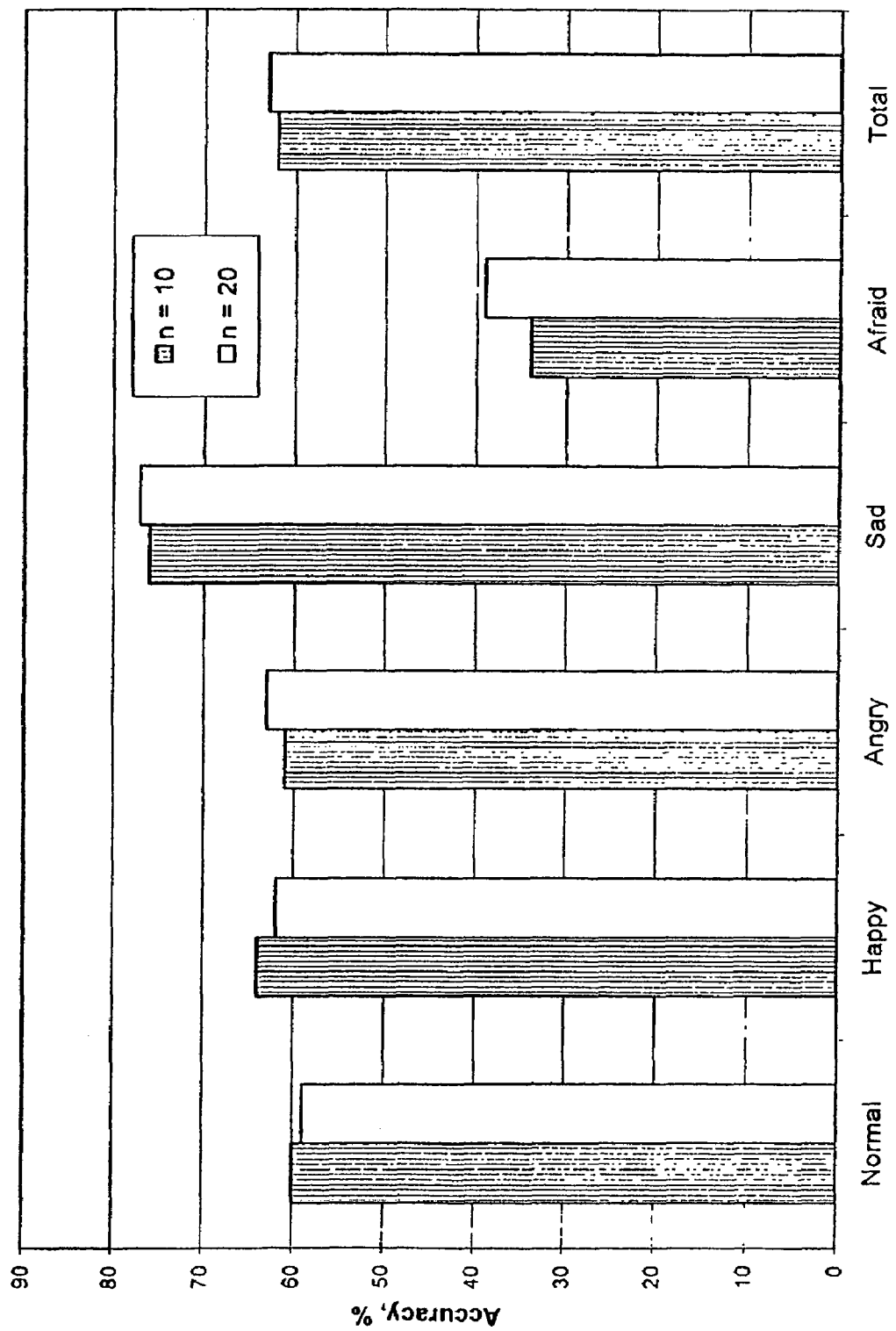
FIG. 10 is a graph showing the average accuracy of recognition for the set of expert neural network classifiers with learned rule.

The important question is how to combine opinions of the experts to classify a given sample. A simple and natural rule is to choose the class in which the expert's value is closest to unity. This rule gives an accuracy of about 60% for the 10-neuron architecture and about 53% for the 20-neuron architecture (FIG. 9). Another approach to rule selection is to use the outputs of expert recognizers as input vectors for another neural network. In this case a neural network is given an opportunity to learn. To explore this approach, a two-layer back propagation neural network architecture with a 5-element input vector, 10 or 20 nodes in the hidden sigmoid layer and five nodes in the output linear layer was used. Five of the best experts were selected and several dozens of neural network recognizers were generated. FIG. 10 presents the average accuracy of these recognizers. The total accuracy is about 63% and stays the same for both 10- and 20-node architectures. The average accuracy for sadness is rather high, about 76%. Unfortunately, it turned out that the accuracy of expert recognizers was not high enough to increase the overall accuracy of recognition.

In general, the approach that outperformed the others was based on ensembles of neural network recognizers. This approach was chosen for the embodiments described below.

Exemplary Apparatuses for Detecting Emotion in Voice Signals

This section describes several apparatuses for analyzing speech in accordance with the present invention and their application for business purposes.

Voice Messaging System

Figure 11:
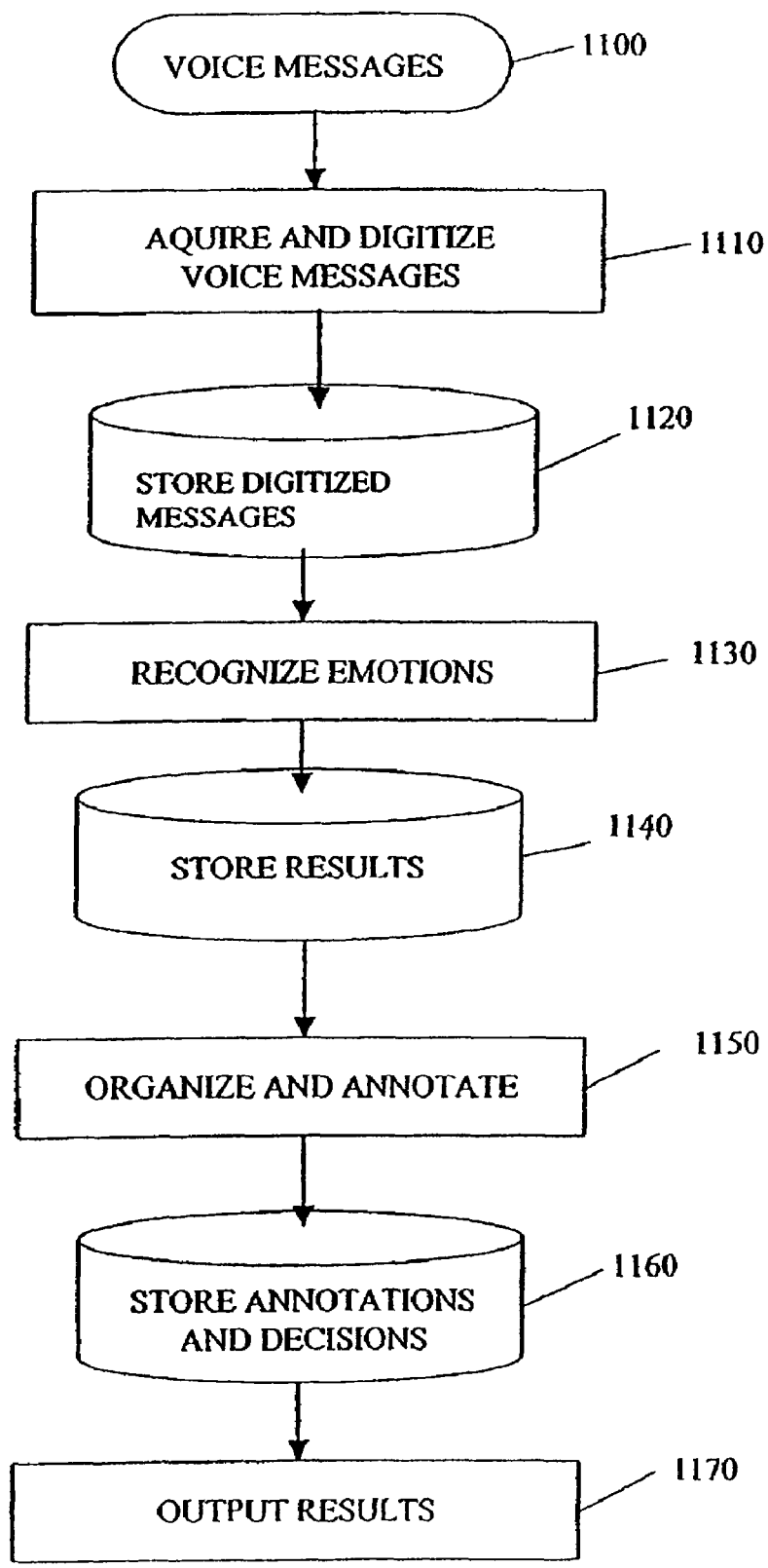
FIG. 11 is a flow chart illustrating a method for managing voice messages based on their emotional content.

FIG. 11 depicts a process that classifies voice messages based on their emotional content. A plurality of voice messages is provided 1100. The messages are transferred over a telecommunication network, are received, digitized and stored 1110 in a storage medium. The result is a set of stored, digitized voice messages 1120. The emotional content of the voice message is determined 1130. The results of emotion recognition are stored 1140 on a storage medium, such as RAM, a data cache, or a hard drive. The voice messages are annotated and organized 1150 based on the determined emotional content. For example, messages that express similar emotions can be grouped together or sorted in descending order according to a degree of a particular emotion expressed in the message. Messages may be routed to different locations based on their emotional content and on other factors. In one embodiment, calls are routed to predetermined locations based on their perceived emotional content.

In a call center environment, an agent may be assigned to call back for messages with a particular emotional content, for example for messages with dominant negative emotions, e.g., sadness, anger or fear. A speech recognition engine can be applied to the message to obtain a transcript as an additional annotation. The annotations and decisions 1160 can be saved and the results output 1170. The output may take the form of a signal or message on a computer, a printed message from a printer, a video display or output device connected to a computer, an audible signal or tone output from an audio output device, or even an alarm. The output may also be routed to predetermined locations based on the emotional content of the message. Routings may include a voice-mail system, an e-mail system or destination, a call center, a customer service center, a manager, or even emergency response personnel.

There are many different ways in which determined emotions can be presented to users in a human-readable (i.e., human recognizable, audible or visual) format. These examples are intended to illustrate and not intended to limit the invention. In a call center application, the summary of the system operation can be presented as an electronic or paper document that summarizes the emotional content of each message, the telephone number to call back, the transcript of the message, and the name of the person assigned to call back. In an application that is designed for managing personal voice mail messages, the system can include additional information to indicate the emotional content of the messages.

For a telephone-based solution, for example, the system can add the following message, "You have three new messages, two of them are highly emotional. Press 1, if you want to listen to the emotional messages first." For a computer-based solution, for example, the system can assign a pictogram or icon that represents the emotional content of the message (an "emoticon") to each message in the mailbox and the system can sort the personal voice mail messages according to their emotional content on request from the user. In the case of a meeting, where a participant or an observer desires to know the emotional state of the other persons present, a signal may be given in a human-recognizable manner, such as by flashing a light or a visible signal, by sounding a tone, or by displaying an icon or message on a computer accessible to the person desiring to know the emotional state.

Figure 12:
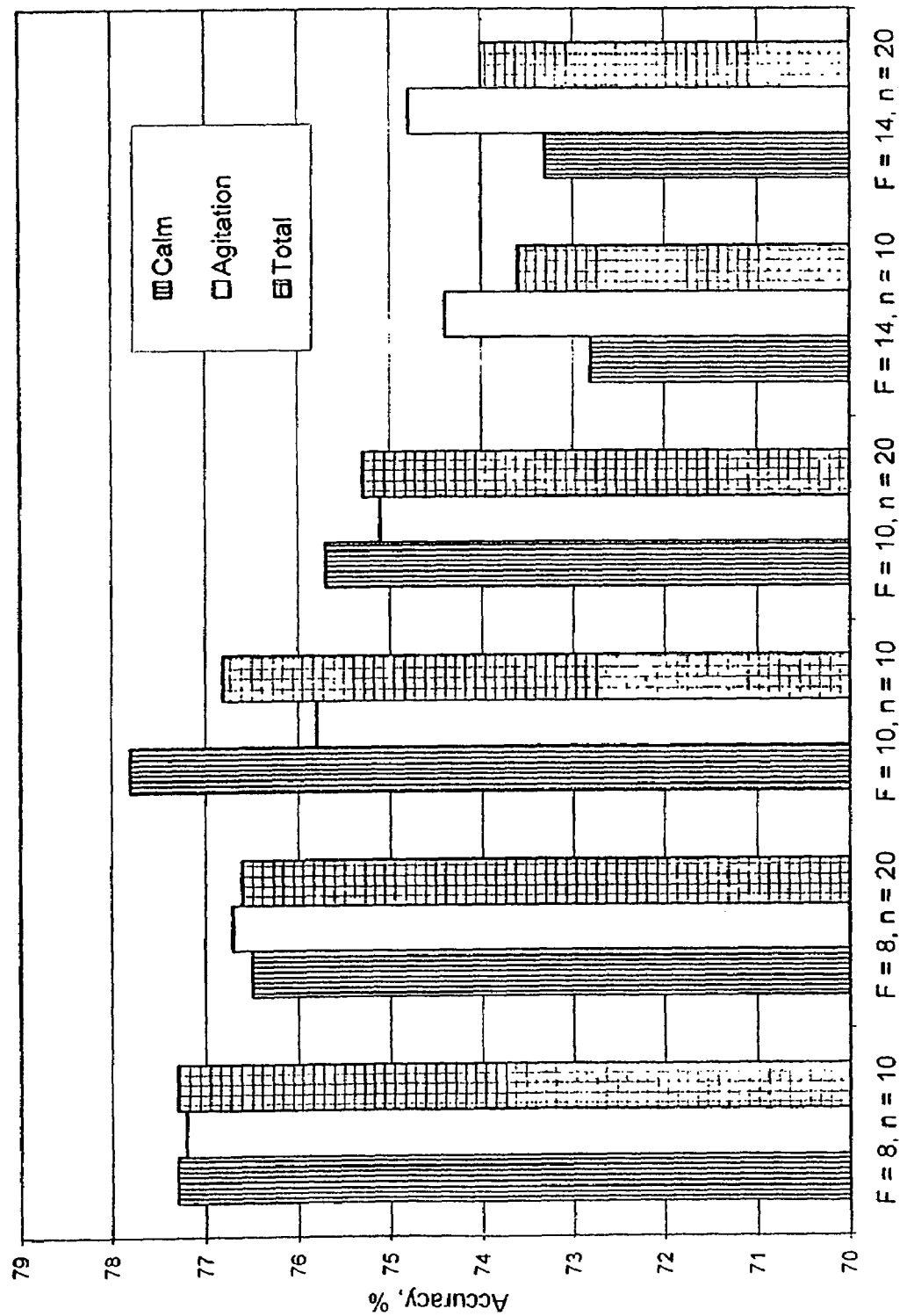
FIG. 12 is a graph showing the average accuracy of recognition for the ensembles of recognizers used in a voice messaging system.

In one of the implementations of the voice messaging system, the goal was to create an emotion recognizer that can process telephone quality voice messages (8 kHz/8 bit) and can be used as a part of a decision support system for prioritizing voice messages and assigning a person to respond to the message. A classifier was created that can distinguish between two states: "agitation" which includes anger, happiness and fear; and "calm," which includes normal state and sadness. To create the recognizer, a sampling of 56 telephone messages of varying length (from 15 to 90 seconds) was used. The messages expressed mostly normal and angry emotions that were recorded by eighteen subjects. These utterances were automatically split into 1-3 second segments, which were then evaluated and labeled by persons. The samples were used for creating recognizers using the methodology as described above. A number of ensembles of 15 neural network classifiers for the 8-, 10-, and 14-statistics inputs and the 10- and 20-node architectures were created. FIG. 12 shows the average accuracy of the ensembles of recognizers. The average accuracy lies in the range of about 73-77% and achieves a maximum of about 77% for the 8-statistics input and 10-node architecture.

The emotion recognition system is a part of a new generation computerized call center that integrates databases, decision support systems, and different media, such as voice messages, e-mail messages and an Internet server, into one information space. The system consists of three processes: monitoring voice files, distributing voice mail from a voice mail center, and prioritizing messages. Monitoring voice files, which corresponds to the operation 1130 from FIG. 11, reads every 10 seconds the contents of a voice message directory, compares it to the list of processed messages, and, if a new message is detected, processes the message and creates two files, a summary file and an emotion description file. The summary file contains the following information: two numbers that describe the distribution of emotions in the message, length and the percentage of silence in the message. The emotion description file lists an emotional content for each 1-3 second segment of message. Operation 1150, prioritizing, is a process that includes reading summary files for processed messages, sorting messages taking into account their emotional content, length and certain other criteria, and suggesting an assignment of persons to return calls. Finally, the prioritizer generates a web page, which lists all current assignments. The voice mail center, distributing messages and corresponding to the output operation 1170, is an additional tool that helps operators and supervisors to output, hear, or visualize the emotional content of voice messages.

Figure 13:
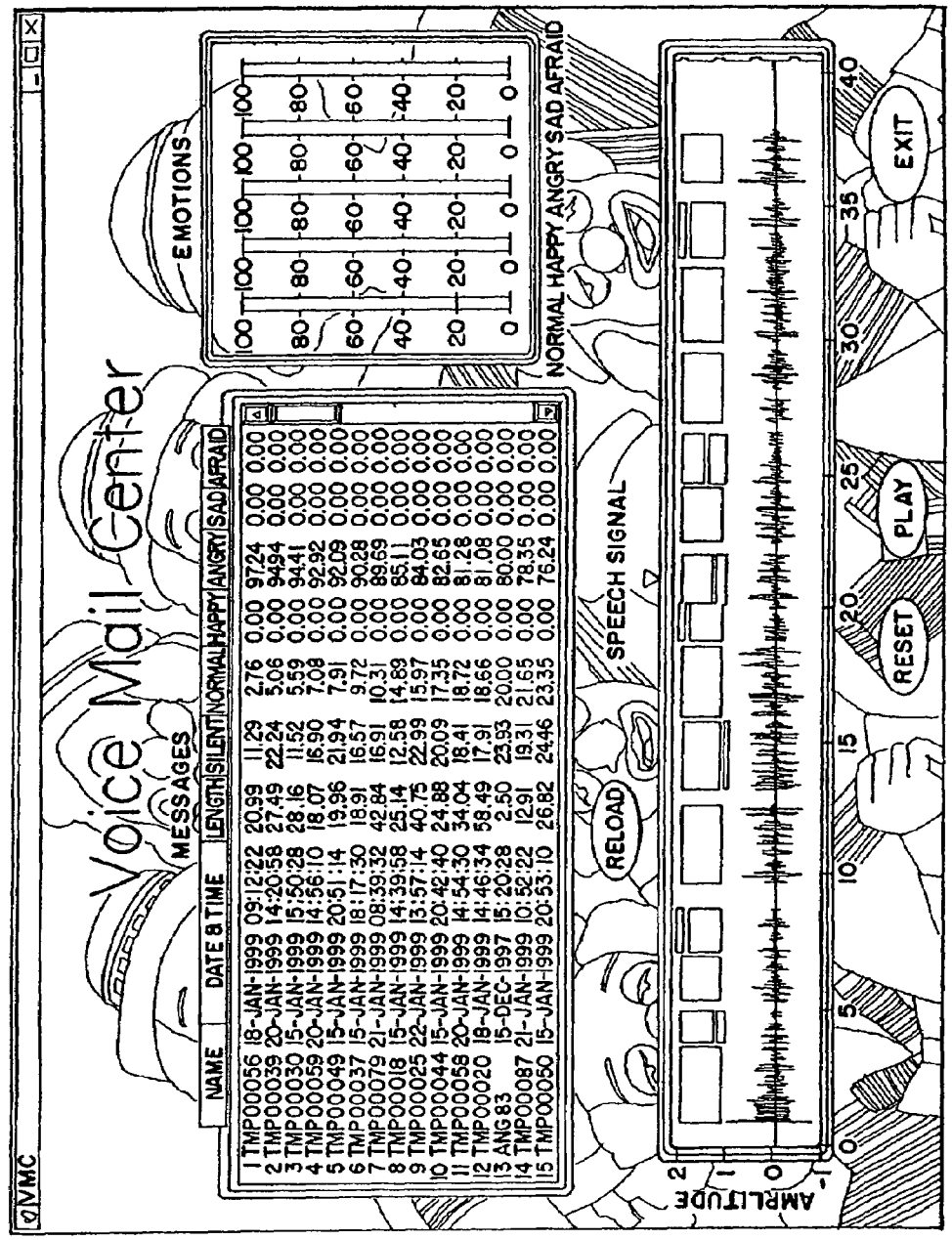
FIG. 13 is an embodiment of a visualization of the voice messaging system.

FIG. 13 presents one embodiment of a voice mail center window. It contains a list of sorted messages on the left side, a set of bar graphs that present the emotional content of the current segment of the message on the right side, and the visual representation of the message and its emotional content in the bottom part of the window. By clicking on the visual representation of the message, the user can see the emotional content of the current segment in a panel on the right. The user can also select a segment of the message and play it back. The emotion detection and display system thus can output a probability of a single emotion or of more than one emotion. As shown in FIG. 13, it is possible for the system to display an estimate or statistic on the probability of each of the possible emotions for the system.

The system can also output a statistic of at least one feature or parameter of a voice or voice signal. The statistic may be any of the statistics discussed above, or any other statistic that may be calculated based on the voice signal and its digitization. For example, the length of the entire message may be measured, recorded and displayed, and the percent of silence in the message (an indicator of anger) can be measured, recorded and displayed. The computer system will also contain, in software or firmware, logic for carrying out all of the above tasks as described above. This will include software for measuring, recording and displaying the above features and statistics. This will also include logic and any necessary hardware, such as physical relays and connections, for routing the necessary indications or signals of the detected emotional state, to the desired locations.

Monitoring Telephonic Conversations

Figure 14:
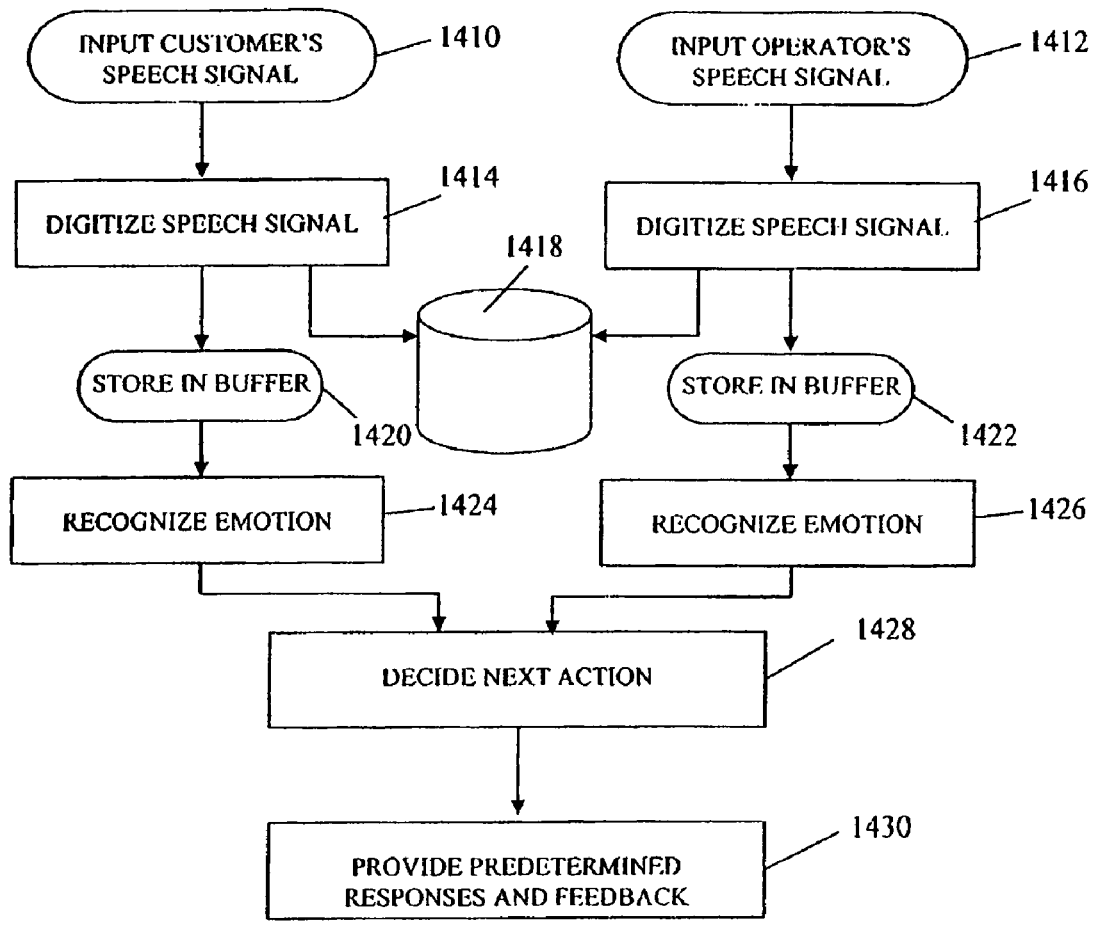
FIG. 14 is a flow chart for a method of monitoring telephonic conversations and providing feedback on detected emotions.

FIG. 14 illustrates one embodiment for monitoring emotions in conversations between a customer and a call center operator, and providing feedback based on the emotions detected. In this case, there are two sources (channels) of speech signal: customer's 1410 and operator's 1412 speech signals. Another salient feature of this embodiment is a requirement for real-time signal processing and decision-making. For each channel, a portion of speech signal is acquired and digitized 1414 and 1416. The results are digitized signals, which are stored in the buffers 1420 and 1422, and can be also saved on a storage medium 1418 for the off-line analysis. In operations 1424 and 1426, emotions associated with both channels are determined and the results' are transferred for decision-making 1428, which detect events of interest. The decision-making software may include logic for special routing of calls when a certain emotion is detected, such as anger. Finally, feedback 1430 is provided to the operator and/or to the team manager, who can assess the situation and intervene if necessary. A set of predetermined responses may also be prepared for certain emotional situations, so that both the operator and management have guidance on how to handle persons displaying certain emotions. For example, a predetermined response to a person with an extraordinary level of anger may be to route the call to management, or to tell the person to call back when he or she is able to control himself or herself. In one embodiment, predetermined responses or guidance for certain emotions may be stored in ROM 116, as depicted in the system of FIG. 1.

The present invention is particularly suited to operation of an emergency response system, such as a 911 system. In such a system, incoming calls are monitored by an embodiment of the present invention. An emotion of the caller would be determined during the caller's conversation with the technician answering the call. The emotion could then be relayed to the emergency response personnel, i.e., police, fire, and/or emergency medical personnel, so they are aware of the emotional state of the caller. In other embodiments, calls may be reviewed and analyzed for better operator performance on future emotional calls.

Operator Performance Evaluation

Figure 15:
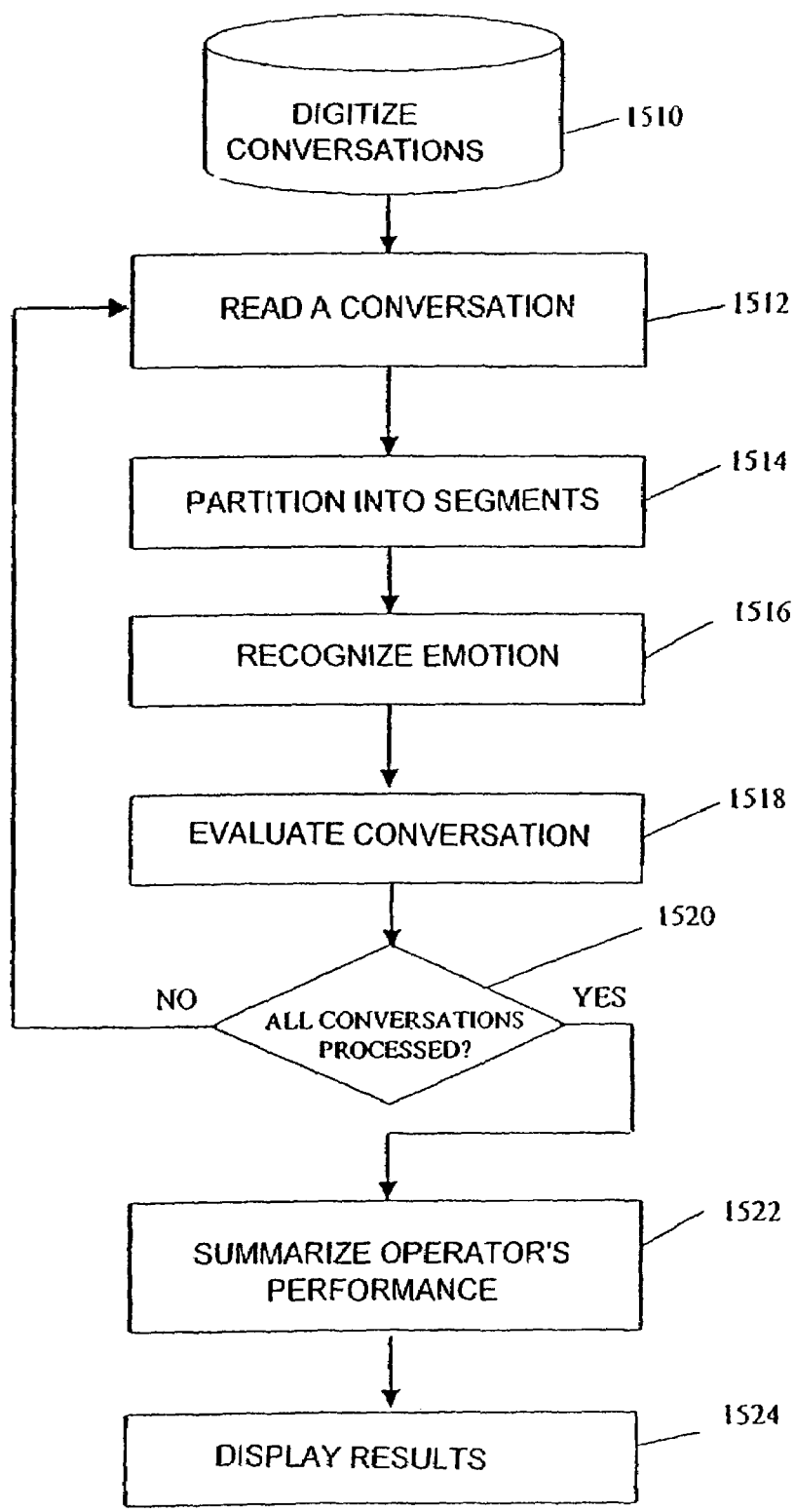
FIG. 15 is a flow chart for a process of evaluating operator performance according to the present invention.

FIG. 15 illustrates an embodiment of the present invention for evaluating operator performance based on analysis of emotional content of conversations between the operator and customers. A plurality of recorded and digitized conversations 1510 between the operator and customers serves as input to an emotional detection system. In operation 1512, each conversation is read into memory. Then, each conversation is divided into 1-second to 3-second segments 1514. After this, the emotional content is determined for each segment 1516. An evaluation metric is then applied for the conversation and an integrated estimate of its quality is calculated. The metrics can take into account other parameters beside the emotional content, such as the length of the conversation, its topic, revenue generated by the call, etc. In operation, the system checks if all conversations have been processed 1520. If not all conversations have been processed, then the next conversation is read and processed, otherwise, the system summarizes the operator's performance 1522, and visualizes results in a form of an electronic or paper output 1524.

Emotional Training

There are several categories of people for whom emotional training can be beneficial. Among them are autistic people, call center operators and would-be dramatic actors and actresses. Autistic people have problems with understanding emotions and responding adequately to emotional situation. The need for expression of a given emotion in a particular situation should be explained to them, and they should be taught how to react to such a situation. A computer system built as a game can be an ideal patient partner for this purpose. Call center operators need to develop advanced skills in recognizing and portraying emotions in speech. Would-be actors also need to develop such skills. A computerized training program can be used for this purpose.

Figure 16:
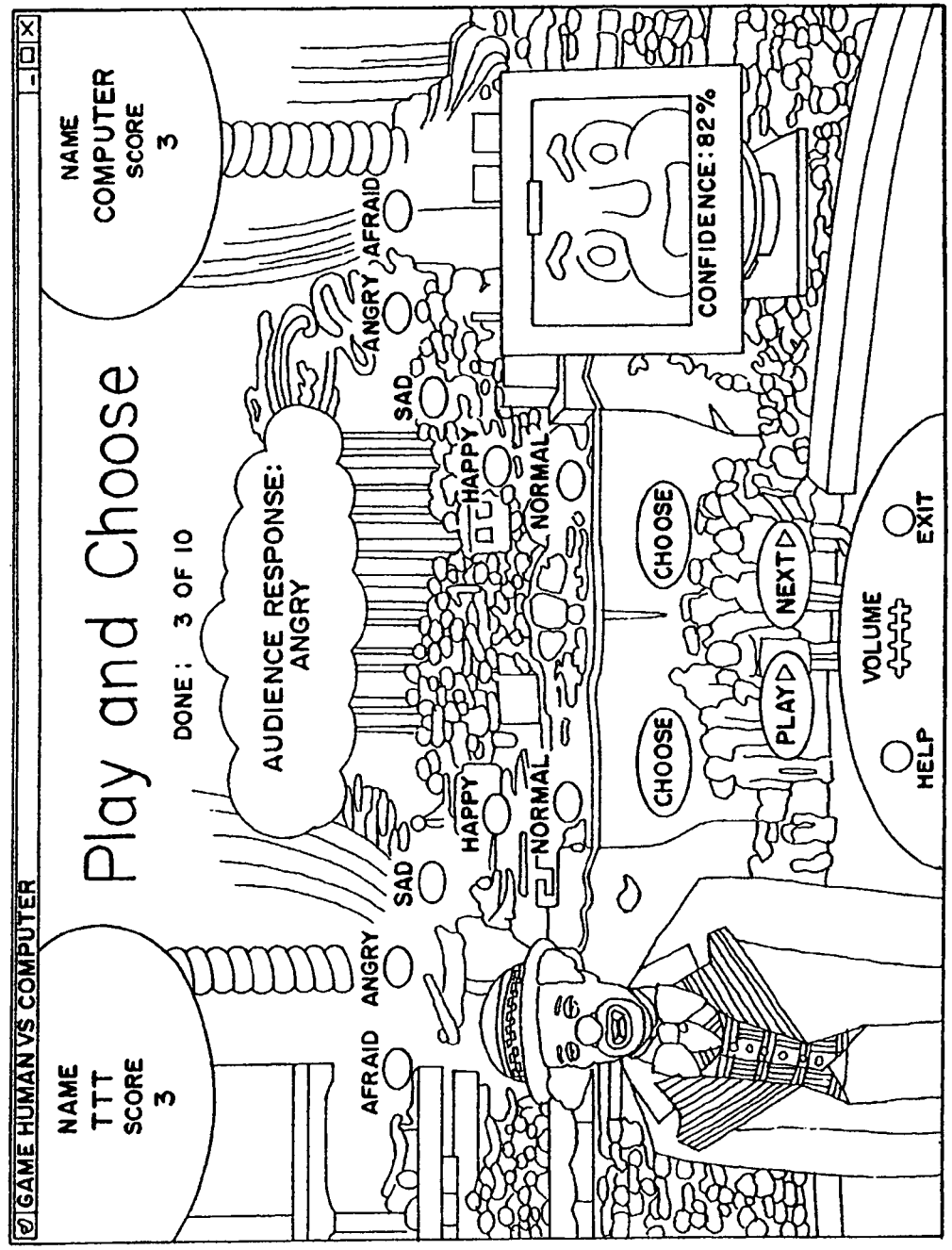
FIG. 16 is an embodiment of a computer-assisted training program/game for acquiring emotion recognition skills.

FIG. 16 shows a snapshot of one embodiment of the present invention that can be used for training of emotion recognition skills. The program allows a user to compete against the computer or another person to see who can better recognize emotion in a speech sample. After entering his or her name and selecting a number of tasks, the user is presented a randomly chosen utterance from a previously recorded data set and is asked to recognize what kind of emotion the utterance presents by choosing one of the five basic emotions. The user clicks on a corresponding button and a clown portrays visually the choice (see FIG. 16). Then the emotion recognition system presents its decision based on the vector of feature values for the utterance. Both the user's and the system's decisions are compared to the decision obtained during the evaluation of the utterance. If only one player gives the right answer, points are added to his or her or a team score. If both players are right then both add points to their scores. The player with the largest score wins. The above-mentioned methods, such as the methods for monitoring telephonic conversations and for operator performance evaluation, can be used in both computer-assisted and face-to-face training.

Detecting Nervousness

Figure 17:
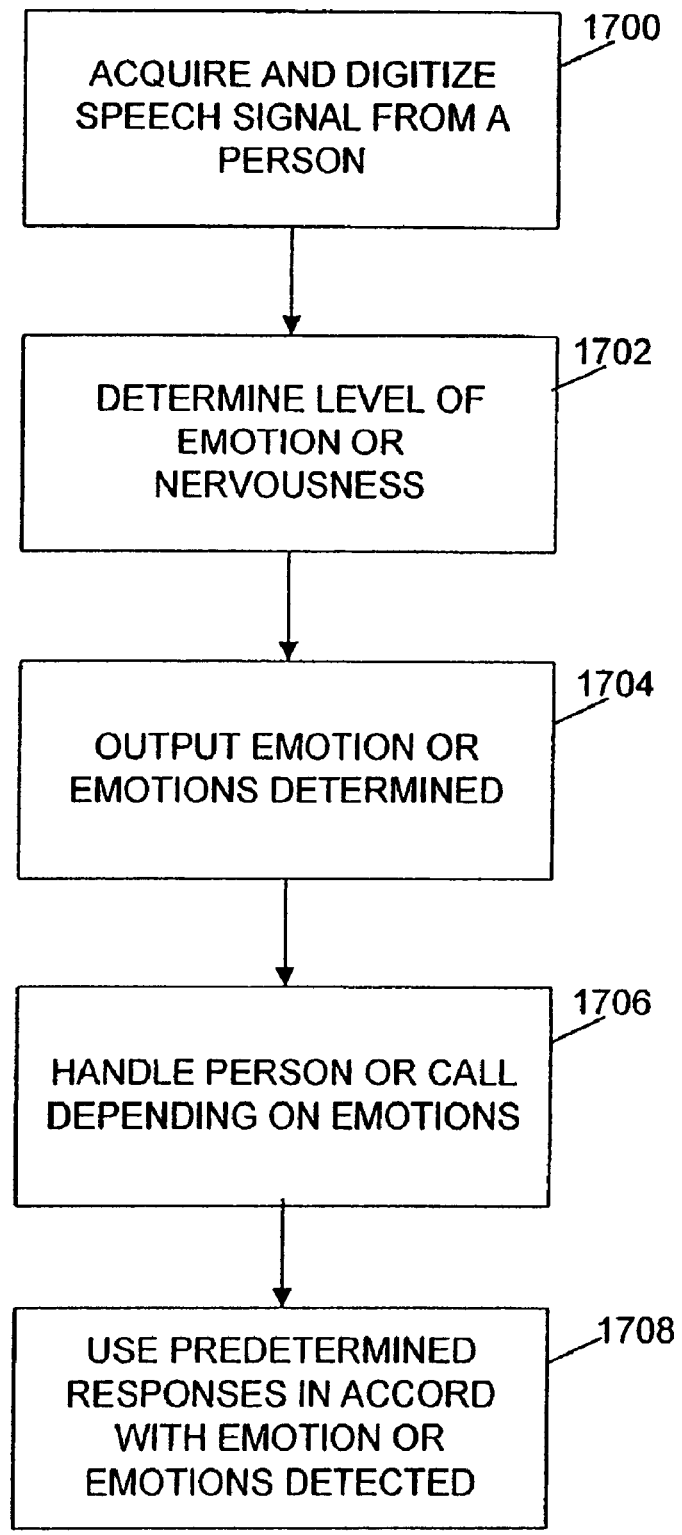
FIG. 17 is a flow chart for a method of detecting nervousness in a voice in a business environment.

FIG. 17 is a flow chart illustrating a method for detecting nervousness in a voice in a business environment to help prevent fraud. First, a, voice signal is received from a person during a business event 1700. For example, voice signals may be obtained from a microphone in the proximity of the person or may be captured from a telephone tap, etc. The voice signals are analyzed during the business event 1702 to determine a level of emotion or nervousness of the person. The voice signals may be analyzed as set forth above.

An indication of the level of emotion or nervousness is 1704 determined and output, preferably before the business event is completed so that one attempting to prevent fraud can make an assessment whether to confront the person before the person leaves. Any kind of display, or output is acceptable, including a paper printout, an audible tone, or a display on a computer screen. This embodiment of the invention may detect emotions other than nervousness. Such emotions include stress or other emotion likely to be displayed by a person committing fraud. The indication of the level of nervousness of the person may be displayed or output in real time to allow one seeking to prevent fraud to obtain results very quickly, so one is able to quickly challenge the person making the suspicious utterance.

As another option, the indication of the level of emotion may include a notification that is sent when the level of emotion or nervousness goes above a predetermined level. The notification may include a visual display on a computer, an auditory sound, etc., or notification to an overseer, the listener, and/or one searching for fraud. The notification could also be sent to a recording device to begin recording the conversation, if the conversation is not already being recorded. The person is then handled 1706 in accordance with the emotion or nervousness detected. In one embodiment, management may develop a set of predetermined responses to help clerks or customer service personnel decide what their course of action should be. The responses may be stored in memory on a CPU 110 of the emotion-detection system, or on a memory accessible to the emotion-detection system, as in ROM 116 of FIG. 1.

This embodiment of the present invention has particular application in business areas such as contract negotiations, insurance dealings, customer service, and the like. Fraud in these areas costs companies billions of dollars each year. The invention may also be used in other environments where it may be useful to detect emotions in persons. These may include law enforcement operations, investigations, security checkpoints, building entrances, and the like.

It will be appreciated that a wide range of changes and modifications to the invention as described are contemplated. Accordingly, while preferred embodiments have been shown and described in detail by way of examples, further modifications and embodiments are possible without departing from the scope of the invention as defined by the examples set forth. It is therefore intended that the invention be defined by the claims and all legal equivalents.

I claim:

1. A method of detecting emotional states of telephone callers, the method comprising:
   providing speech signals from telephone callers;
   dividing the speech signals into at least one of segments, frames, and subframes;
   extracting acoustic features from the speech signals;
   calculating statistics from the acoustic features;
   classifying the speech with at least one neural network classifier as belonging to at least one emotional state;
   storing the speech signals and the emotional states in a storage medium, in a manner to allow later retrieval of the stored speech signals and emotional states;
   outputting in a human-recognizable format an indication of the at least one emotional state;

wherein the speech is classified by a classifier taught to recognize at least one emotional state from a finite number of emotional states;
wherein the speech is classified as emotional or non-emotional; and
further comprising routing calls containing said speech signals to at least one predetermined location according to the at least one classified emotional state.

2. The method of claim 1, wherein the speech is classified as at least one of angry, sad, happy, afraid and neutral.

3. The method of claim 1, wherein the at least one neural network is taught to recognize an emotional state by dividing speech samples into training and testing segments, and wherein an algorithm for recognizing an emotional state is adjusted by comparing a classification from the neural network to a classification by at least one person.

4. The method of claim 1, wherein the calls containing the speech signals are routed to at least one location selected from the group consisting of a voice-mail center, a call center, an e-mail destination, a customer service center, a manager, and emergency response personnel.

5. The method of claim 1, wherein the storage medium is random access memory.

6. The method of claim 1, wherein the storage medium is a hard drive.

7. The method of claim 1, further comprising annotating and organizing the speech signals and emotional states based on the emotional content.

8. A system for classifying speech contained in telephone calls, the system comprising:
    a computer system comprising a central processing unit, an input device, at least one random access memory for storing data indicative of speech signals, and an output device;
    logic for receiving and analyzing speech signals of telephone callers;
    logic for dividing the speech signals of the telephone callers;
    logic for extracting at least one feature from the speech signals of the telephone callers;
    logic for calculating statistics of the speech of the telephone callers;
    logic for at least one neural network for classifying the speech of the telephone callers as belonging to at least one of a finite number of emotional states; and
    logic for storing the speech signals and the emotional states in a storage medium, in a manner to allow later retrieval of the stored speech signals and emotional states;
    logic for outputting an indication of the at least one emotional state of the telephone callers;
    wherein the logic for at least one neural network comprises at least one three-layer neural network; and
    further comprising logic for routing a call containing said speech signals to at least one predetermined location according to the at least one classified emotional state.

9. The system of claim 8, wherein the logic classifies the speech as one of emotional and non-emotional.

10. The system of claim 8, wherein the logic classifies the speech as at least one of angry, sad, happy, afraid and normal.

11. The system of claim 8, wherein the logic routes the calls containing the speech signals to at least one location selected from the group consisting of a voice-mail center, a call center, an e-mail destination, a customer service center, a manager, and emergency response personnel.

12. The system of claim 8, wherein the storage medium is random access memory.

13. The system of claim 8, wherein the storage medium is a hard drive.

14. The system of claim 8, further comprising logic for annotating and organizing the speech signals and emotional states based on the emotional content.

15. A method of recognizing emotional states in a voice of a telephone caller, the method comprising:
    providing a first plurality of voice samples;
    obtaining a second plurality of voice samples of a telephone caller, from a telephone call;
    identifying each sample of said pluralities of samples as belonging to a predominant emotional state;
    dividing each sample into at least one of frames, subframes, and segments;
    extracting at least one acoustic feature for each sample of the pluralities of samples;
    calculating statistics of the speech samples from the at least one feature;
    classifying an emotional state in the first plurality of samples with at least one neural network;
    training the at least one neural network to recognize an emotional state from the statistics by comparing the results of identifying and classifying for the first plurality of samples;
    classifying an emotion in the second plurality of voice samples obtained from a telephone call with the at least one trained neural network;
    storing the voice samples and the emotional states in a storage medium, in a manner to allow later retrieval of the stored voice samples and emotional states;
    outputting in a human-recognizable format an indication of the emotional state of the telephone caller; and
    routing the call containing said voice samples to at least one predetermined location according to the at least one classified emotional state.

16. The method of claim 15, wherein the calls containing the voice samples are routed to at least one location selected from the group consisting of a voice-mail center, a call center, an e-mail destination, a customer service center, a manager, and emergency response personnel.

17. The method of claim 15, wherein the storage medium is random access memory.

18. The method of claim 15, wherein the storage medium is a hard drive.

19. The method of claim 15, further comprising annotating and organizing the voice samples and emotional states based on the emotional content.

20. A system for detecting emotional states of telephone callers from speech signals of telephone calls, the system comprising:
    a speech reception device;
    at least one computer connected to the speech reception device;
    at least one random access memory operably connected to the at least one computer;
    a computer program including at least one neural network for dividing the speech signals into a plurality of segments, and for analyzing the segments according to features of the segments to detect the emotional state in the speech signals, and storing the speech signals and the emotional states in a storage medium, in a manner to allow later retrieval of the stored speech signals and emotional states and outputting in a human-recognizable format an indication of the emotional state of the speech signals;

an output device coupled to the computer for notifying a user of the emotional states of the telephone callers detected in the speech signals;

wherein the at least one neural network comprises at least one three-layer neural network; and further comprising logic for routing a call containing said speech signals to at least one predetermined location according to the at least one classified emotional state.

21. The system of claim 20, further comprising a set of predetermined responses to persons voicing a speech signal displaying a particular emotional state.

22. The system of claim 20, wherein the logic routes the calls containing the speech signals to at least one location selected from the group consisting of a voice-mail center, a call center, an e-mail destination, a customer service center, a manager, and emergency response personnel.

23. The system of claim 20, wherein the storage medium is random access memory.

24. The system of claim 20, wherein the storage medium is a hard drive.

25. The system of claim 20, further comprising logic for annotating and organizing the speech signals and emotional states based on the emotional content.

* * * * *